(12) United States Patent
Gaw et al.

(10) Patent No.: US 9,169,029 B2
(45) Date of Patent: Oct. 27, 2015

(54) CONDUCTIVE COUPLING ASSEMBLY

(71) Applicant: The Boeing Company, Chicago, IL (US)

(72) Inventors: Kevin O'Brien Gaw, Tukwila, WA (US); Nathan Michael Kelley, Everett, WA (US); John Thomas Axtell, Bellevue, WA (US); James Patrick Irwin, Renton, WA (US); David William Minteer, Lake Tapps, WA (US); Diego A. Velasco, Seattle, WA (US)

(73) Assignee: The Boeing Company, Chicago, IL (US)

( * ) Notice: Subject to any disclaimer, the term of this patent is extended or adjusted under 35 U.S.C. 154(b) by 102 days.

(21) Appl. No.: 13/747,732

(22) Filed: Jan. 23, 2013

(65) Prior Publication Data

US 2013/0327888 A1      Dec. 12, 2013

Related U.S. Application Data

(60) Provisional application No. 61/657,248, filed on Jun. 8, 2012, provisional application No. 61/669,299, filed on Jul. 9, 2012, provisional application No. 61/712,930, filed on Oct. 12, 2012.

(51) Int. Cl.
*F16L 25/01*    (2006.01)
*B64D 45/02*    (2006.01)
(Continued)

(52) U.S. Cl.
CPC . *B64D 45/02* (2013.01); *F16L 9/14* (2013.01); *F16L 21/065* (2013.01); *F16L 25/01* (2013.01);
(Continued)

(58) Field of Classification Search
CPC ....................................... F16L 25/01
USPC ........... 439/192; 361/215, 212; 285/365, 366, 285/367, 411
See application file for complete search history.

(56) References Cited

U.S. PATENT DOCUMENTS 2,589,876 A      3/1952  Sesher
2,883,211 A *    4/1959  Grass .......................... 285/367
(Continued)

FOREIGN PATENT DOCUMENTS

EP        0297990 A1    1/1989
EP        2053294 A2    4/2009
(Continued)

OTHER PUBLICATIONS

Minteer et al., "Fluid Transport System for Preventing Electrical Discharge," U.S. Appl. No. 13/747,780, filed Jan. 23, 2013, 66 pages.
(Continued)

*Primary Examiner* — David E Bochna
(74) *Attorney, Agent, or Firm* — Yee & Associates, P.C.

(57) ABSTRACT

A method and apparatus for conducting an electrical current between a first transport member and a second transport member. In one illustrative embodiment, a coupling assembly comprises a first fitting associated with a first end of a first transport member, a second fitting associated with a second end of a second transport member, and a seal. The seal is configured for placement around the first fitting and the second fitting when the first end of the first transport member is positioned relative to the second end of the second transport member. The seal is further configured to seal an interface between the first transport member and the second transport member. The seal is comprised of a material configured such that the seal has a level of conductivity within a selected range and such that a conductive pathway is formed between the first transport member and the second transport member.

17 Claims, 13 Drawing Sheets

(51) Int. Cl.
  *F16L 25/02* (2006.01)
  *F17D 1/00* (2006.01)
  *F16L 9/14* (2006.01)
  *H05F 1/00* (2006.01)
  *F16L 21/06* (2006.01)

(52) U.S. Cl.
  CPC ............. *F16L 25/025* (2013.01); *F16L 25/026* (2013.01); *F17D 1/00* (2013.01); *H05F 1/00* (2013.01); *Y10T 137/8593* (2015.04)

(56) References Cited

U.S. PATENT DOCUMENTS

| | | | | |
|---|---|---|---|---|
| 2,966,539 | A * | 12/1960 | Sears et al. | 285/374 |
| 3,244,797 | A | 4/1966 | Watson | |
| 3,783,178 | A * | 1/1974 | Philibert et al. | 439/100 |
| 3,838,205 | A * | 9/1974 | Kish | 285/369 |
| 3,943,273 | A * | 3/1976 | de Putter | 361/215 |
| 3,992,568 | A * | 11/1976 | Al | 285/372 |
| 3,999,825 | A | 12/1976 | Cannon | |
| 4,107,452 | A * | 8/1978 | Razvi | 361/215 |
| 4,120,325 | A * | 10/1978 | de Putter | 361/215 |
| 4,249,786 | A * | 2/1981 | Mahoff | 285/373 |
| 4,633,363 | A * | 12/1986 | Bordner | 361/215 |
| 4,635,162 | A * | 1/1987 | McLaughlin | 361/215 |
| 4,881,760 | A * | 11/1989 | Runkles et al. | 285/373 |
| 5,466,890 | A * | 11/1995 | Stagnitti | 439/95 |
| 5,620,210 | A * | 4/1997 | Eyster et al. | 285/373 |
| 6,880,859 | B2 * | 4/2005 | Breay et al. | 285/363 |
| 6,905,141 | B2 * | 6/2005 | Winter et al. | 285/368 |
| 7,222,889 | B2 * | 5/2007 | Breay | 285/386 |
| 7,686,344 | B2 | 3/2010 | Vieira | |
| 7,690,692 | B2 * | 4/2010 | Athalye et al. | 285/239 |
| 8,003,014 | B2 | 8/2011 | Breay et al. | |
| 8,215,678 | B2 * | 7/2012 | Peachey | 285/302 |
| 8,360,477 | B2 * | 1/2013 | Flynn | 285/302 |
| 2004/0135371 | A1 | 7/2004 | Masuda et al. | |
| 2006/0099843 | A1 * | 5/2006 | Fullner et al. | 439/275 |
| 2009/0322078 | A1 | 12/2009 | Wern et al. | |
| 2010/0122749 | A1 | 5/2010 | Bouleti et al. | |
| 2012/0056416 | A1 * | 3/2012 | Briand | 285/119 |

FOREIGN PATENT DOCUMENTS

| | | |
|---|---|---|
| EP | 2189702 A1 | 5/2010 |
| EP | 2261543 A2 | 12/2010 |
| WO | WO2010044930 A2 | 4/2010 |
| WO | WO2011007100 A2 | 1/2011 |

OTHER PUBLICATIONS

Irwin et al., "Composite Tubes for a Fluid Transport System," U.S. Appl. No. 13/747,761, filed Jan. 23, 2013, 63 pages.
Extended European Search Report, dated Sep. 30, 2013, regarding Application No. EP13170668.1, 6 pages.
Extended European Search Report, dated Oct. 8, 2013, regarding Application No. EP13170662.4, 5 pages.
Extended European Search Report, dated Sep. 30, 2013, regarding Application No. EP13170676.4, 5 pages.
Office Action dated Jan. 15, 2015, regarding U.S. Appl. No. 13/747,780, 25 pages.
Notice of Allowance dated May 6, 2015, regarding application U.S. Appl. No. 13/747,780, 13 pages.
Office Action dated Jul. 6, 2015, regarding U.S. Appl. No. 13/747,761, 19 pages.
Canadian Intellectual Property Office Examination Search Report, dated Jun. 4, 2015, regarding Application No. 2,811,398, 5 pages.
Canadian Intellectual Property Office Examination Search Report, dated Jun. 4, 2015, regarding Application No. 2,811,399, 5 pages.

* cited by examiner

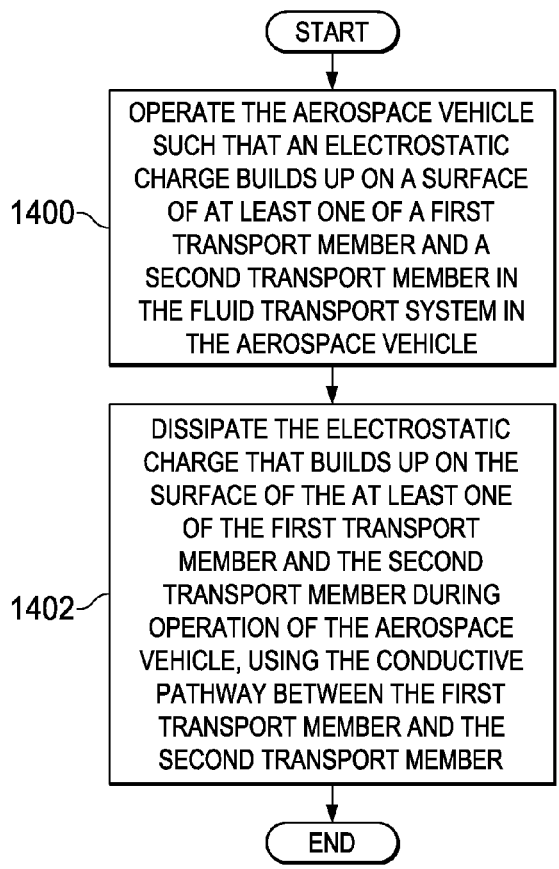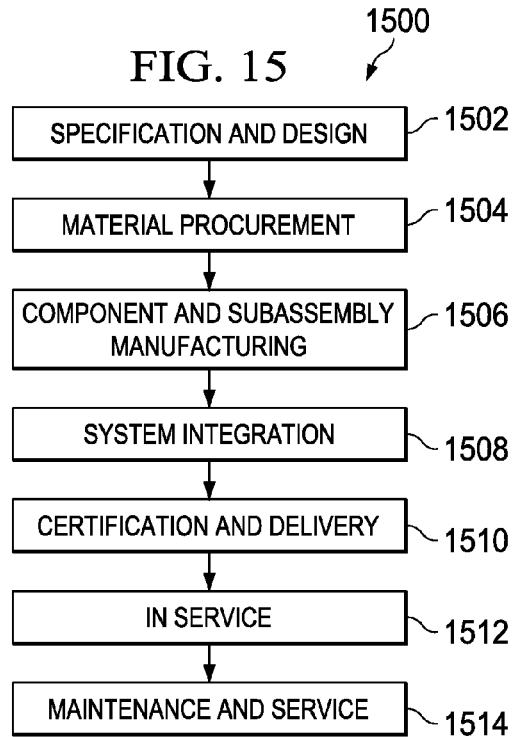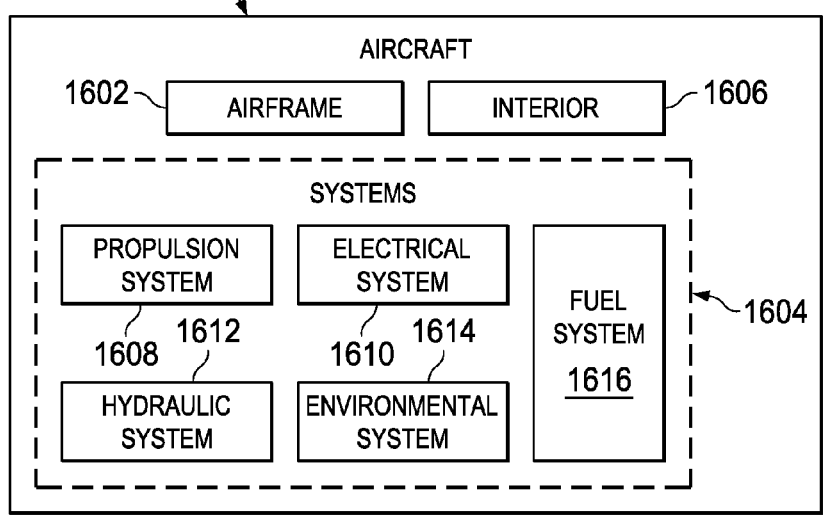

CONDUCTIVE COUPLING ASSEMBLY

RELATED PROVISIONAL APPLICATIONS

This application is related to, and claims the benefit of priority of, the following provisional patent applications: Provisional Application for Patent Ser. No. 61/657,248, filing date Jun. 8, 2012, entitled "Conductive Coupling Assembly;" Provisional Application for Patent Ser. No. 61/669,299, filing date Jul. 9, 2012, entitled "Composite Tubes for a Fluid Transport System;" and Provisional Application for Patent Ser. No. 61/712,930, filing date Oct. 12, 2012, entitled "Fluid Transport System for Preventing Electrical Discharge;" all of which are incorporated herein by reference.

CROSS-REFERENCES TO RELATED CASES

This application is related to the following patent applications: entitled "Composite Tubes for a Fluid Transport System," filing date Jan. 23, 2013, Ser. No. 13/747,761; and entitled "Fluid Transport System for Preventing Electrical Discharge," Ser. No. 13/747,780, filing date Jan. 23, 2013; filed of even date herewith, each assigned to the same assignee, and each incorporated herein by reference.

BACKGROUND INFORMATION

1. Field

The present disclosure relates generally to a fluid transport system and, in particular, to a fluid transport system configured to have a desired electrical configuration. Still more particularly, the present disclosure relates to a method and apparatus for limiting the flow of electric current, induced by an event such as lightning or an electrical fault, along a fluid transport system and allowing static dissipation along the fluid transport system.

2. Background

A fluid transport system typically includes tubes connected together for moving fluid through the tubes. As used herein, a "fluid" may comprise any number of liquids and/or gases. Fluid transport systems may be used to transport any number of fluids within vehicles, such as, for example, aircraft. A fluid transport system may include groups of tubes connected in series, in parallel, or a combination of the two. In some cases, these tubes may be coupled together using, for example, without limitation, coupling assemblies.

A fuel system is an example of one type of fluid transport system in an aircraft. Some currently available fuel systems comprise fuel tanks comprised of metal and/or composite materials, such as carbon fiber reinforced plastic (CFRP). When used in fuel tanks, fuel tubes comprised of plastic and/or metal materials may be prone to the buildup of electrostatic charge. The buildup of electrostatic charge on a fuel tube may be caused by a number of different factors including, but not limited to, the flow of fuel through and/or around the fuel tube.

When electrostatic charge builds up on a surface of a fuel tube, the fuel tube may be prone to electrical discharge of this electrostatic charge. This electrical discharge may be referred to as "static discharge." Static discharge may take the form of, for example, an electrical arc from the fuel tube to a nearby structure.

Further, when used in a fuel tank comprised of electrically resistive materials such as, for example, carbon reinforced plastic, fuel tubes comprised of plastic and/or metal materials may also be prone to voltages and currents induced by an electromagnetic event, such as lightning. In some situations, the induced voltages may lead to electrical discharge in the form of electrical sparking and/or arcing from the tubes to one or more nearby structures. Additionally, in some situations, the induced currents may lead to electrical discharge within the connections between tubes.

The voltage and currents induced by lightning may typically be small and within selected tolerances inside the fuel tanks of aircraft having wings comprised of metal materials, such as, for example, aluminum. However, the voltages and currents induced by lightning inside the fuel tanks of aircraft having wings comprised of non-metallic materials, such as, for example, carbon fiber reinforced plastic, may be greater and outside of selected tolerances. In particular, the higher electrical resistance of carbon fiber reinforced plastic as compared to aluminum may cause larger voltages and currents to be induced with respect to the tubes inside the fuel tanks.

Typically, with currently available aircraft, fuel transport systems use metal tubing to transport fuel within fuel tanks. In an aircraft comprised of carbon fiber reinforced plastic, the metal tubing may be prone to induced voltages that may cause undesired electrical discharges. Some currently available methods for reducing the level or intensity of an undesired electrical discharge may include inserting high resistance electrical isolators into the metal tubing. These isolators may be used to constrain the currents and voltages that may be induced by lightning, thereby reducing the level of any undesired electrical discharge that may occur.

However, the weight and expense needed to install metal systems having these isolators may be greater than desired. Part of the cost and expense to install such metal systems with isolators may be the need to protect the metal systems against arcing from the induced voltages remaining in the system after the installation of the isolators.

Additionally, an electrical discharge within a fuel system caused by the buildup of electrostatic charge and/or induced voltages and currents in response to an electromagnetic event such as lightning may present safety concerns. Therefore, it would be desirable to have a method and apparatus that takes into account at least some of the issues discussed above, as well as other possible issues.

SUMMARY

In one illustrative embodiment, a coupling assembly comprises a first fitting associated with a first end of a first transport member, a second fitting associated with a second end of a second transport member, and a seal. The seal is configured for placement around the first fitting and the second fitting when the first end of the first transport member is positioned relative to the second end of the second transport member. The seal is further configured to seal an interface between the first end of the first transport member and the second end of the second transport member. The seal is comprised of a material configured such that the seal has a level of conductivity within a selected range and such that a conductive pathway is formed between the first transport member and the second transport member.

In another illustrative embodiment, a fuel system comprises a first transport member, a second transport member, and a coupling assembly. The coupling assembly is configured to couple a first end of the first transport member to a second end of the second transport member. The coupling assembly comprises a first fitting associated with the first end of the first transport member and having a level of conductivity within a selected range, a second fitting associated with the second end of the second transport member and having the level of conductivity within the selected range, a first gasket, a second gasket, and a sleeve. The first gasket is configured for placement around the first fitting. The first gasket comprises a viscoelastic material having the level of conductivity within the selected range. The second gasket is configured for placement around the second fitting. The second gasket comprises the viscoelastic material having the level of conductivity within the selected range. The sleeve is configured for placement around the first gasket and the second gasket and having the level of conductivity within the selected range. The sleeve is configured to compress the first gasket and the second gasket to form a seal that seals an interface between the first end of the first transport member and the second end of the second transport member when the first end of the first transport member is positioned relative to the second end of the second transport member. The seal forms a conductive pathway between the first transport member and the second transport member through the first fitting, the seal, and the second fitting.

In yet another illustrative embodiment, a method for conducting an electrical current between a first transport member and a second transport member in a fuel system in an aerospace vehicle is provided. The aerospace vehicle is operated such that an electrical charge builds up around a surface of at least one of the first transport member and the second transport member in the fuel system in the aerospace vehicle. A first end of the first transport member is coupled to a second end of the second transport member using a first fitting associated with the first end of the first transport member, a second fitting associated with the second end of the second transport member, and a seal. The seal is configured to seal an interface between the first end of the first transport member and the second end of the second transport member when the first end of the first transport member is positioned relative to the second end of the second transport member. The seal is comprised of a material configured such that the seal has a level of conductivity within a selected range and such that a conductive pathway is formed between the first transport member and the second transport member. Electrostatic charge that builds up on at least one of the first transport member and the second transport member during operation of the aerospace vehicle is dissipated using the conductive pathway formed by the seal between the first transport member and the second transport member.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 14 is an illustration of a process for dissipating electrostatic charge in the form of a flowchart in accordance with an illustrative embodiment;

FIG. 15 is an illustration of an aircraft manufacturing and service method in the form of a flowchart in accordance with an illustrative embodiment; and FIG. 16 is an illustration of an aircraft in the form of a block diagram in accordance with an illustrative embodiment.

DETAILED DESCRIPTION

Figure 1:
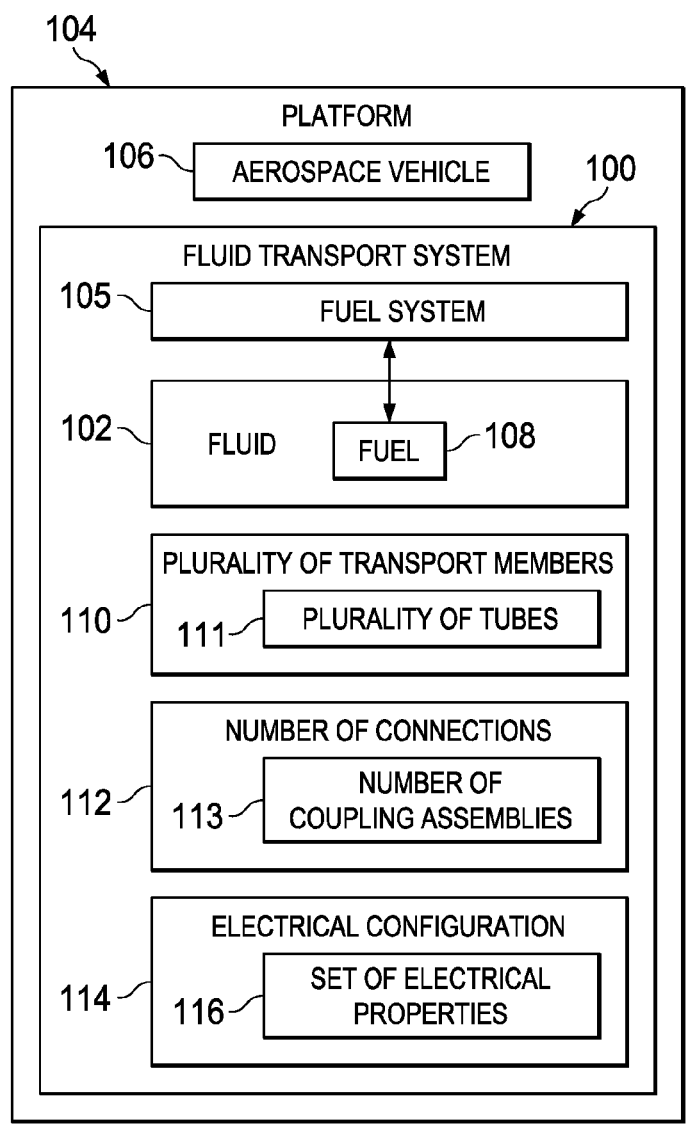
FIG. 1 is an illustration of a fluid transport system in the form of a block diagram in accordance with an illustrative embodiment.

The different illustrative embodiments recognize and take into account different considerations. For example, the different illustrative embodiments recognize and take into account that it may be desirable to have a fluid transport system configured to reduce the intensity of electrical discharge from components, such as, for example, tubes, within the fluid transport system.

The different illustrative embodiments recognize and take into account that tubes comprised of materials with high electrical resistance levels may be used in a fluid transport system to reduce the intensity of electrical discharge caused by voltages and currents induced in response to an electromagnetic event such as, for example, lightning. High levels of electrical resistance may include levels above, for example, about 100 kilohms per meter length of tube.

Materials with high levels of electrical resistance include, but are not limited to, nonmetallic fiber reinforced composite materials, carbon reinforced plastic materials, plastic materials, non-homogenous metallic materials, and/or other types of materials. The illustrative embodiments recognize and take into account that tubes comprised of any of these types of materials may limit the levels of voltages and currents induced in response to the occurrence of an electromagnetic event, thereby reducing the intensity of any electrical discharge caused by these induced voltages and/or currents.

For example, materials having high levels electrical resistance may limit the current induced along a tube in response to an electromagnetic event, such as lightning. With fuel tubes in a fuel system, limiting the flow of current along these fuel tubes may limit the voltages induced across the connections between these fuel tubes when the electrical resistance of these connections is lower than the electrical resistance through a specified length of fuel tube connected to the connection. The specified length, for example, may be 0.3 meters of tube. In this manner, electrical discharge in the form of electrical sparking and/or arcing may be reduced and/or prevented. Consequently, the illustrative embodiments recognize and take into account that an upper limit for resistivity or, equivalently, a lower limit for conductivity, may be selected for the materials used in the connections between fuel tubes to reduce electrical discharge across these connections and along the fuel tubes.

However, the illustrative embodiments recognize and take into account that in some cases, if a conductive material were to become dislodged from a connection between fuel tubes and form a bridge between a metal fuel tube and a structure within the fuel tank, the conductive material could short circuit this bridge and allow, for example, lightning to induce a flow of current or possibly a spark from the fuel tube to the structure. As a result, the illustrative embodiments recognize and take into account that the resistivity of the conductive material may require a lower limit for resistivity, or equivalently, an upper limit for conductivity.

However, the different illustrative embodiments recognize and take into account that in other cases, fuel tubes may be used in metallic fuel tanks in which lightning induced voltages and/or currents may be within selected tolerances. Consequently, the materials used in the connections between fuel tubes may only need to be selected to allow dissipation of electrostatic charge that has built up along these fuel tubes. Consequently, the illustrative embodiments recognize and take into account that only an upper limit for resistivity or, equivalently, a lower limit for conductivity, may need to be selected for the materials used in the connections between fuel tubes to reduce electrical discharge across these connections.

Further, the illustrative examples recognize and take into account that the possibility of a static discharge caused by the build-up of electrostatic charge may be reduced and/or prevented by grounding fuel tubes to a structure having a resistance that is sufficiently low to remove electrostatic charge from the fuel tubes at a rate faster than the electrostatic charge can build up on the fuel tubes such that a net charge on the fuel tubes within selected tolerances may be maintained. In particular, a net charge on the fuel tubes may be reduced to within selected tolerances. The different illustrative embodiments recognize and take into account that when fuel tubes are connected in series, electrostatic charge may be removed from the series of fuel tubes by using conductive pathways through the connections between the fuel tubes and then grounding the series to the structure.

Thus, the different illustrative embodiments provide a system and method for reducing an intensity of electrical discharge within a fluid transport system. In one illustrative embodiment, the fluid transport system is located within a vehicle, such as an aerospace vehicle. Further, the fluid transport system may be comprised of materials selected such that the fluid transport system has a selected electrical configuration. This electrical configuration for the fluid transport system may be selected such that electrical discharge that occurs within the fluid transport system during operation of the aerospace vehicle may be reduced to within selected tolerances.

Referring now to the figures and, in particular, with reference to FIG. 1, an illustration of a fluid transport system in the form of a block diagram is depicted in accordance with an illustrative embodiment. Fluid transport system 100 is configured to transport materials within platform 104.

The materials transported may include any number of liquid materials, gaseous materials, and/or solid materials. As one illustrative example, fluid transport system 100 may be used to transport fluid 102 within platform 104. Fluid 102 may comprise any number of liquids and/or gases.

In one illustrative example, platform 104 takes the form of aerospace vehicle 106. In this illustrative example, fluid transport system 100 may take the form of fuel system 105 configured to transport fluid 102 in the form of fuel 108 within aerospace vehicle 106. Aerospace vehicle 106 may be selected from one of an aircraft, a helicopter, an unmanned aerial vehicle (UAV), a space shuttle, or some other suitable type of vehicle configured to travel in air and/or space. Of course, in other illustrative examples, platform 104 may take the form of a ground vehicle, a water vehicle, or some other suitable type of vehicle.

As depicted, fluid transport system 100 comprises plurality of transport members 110 and number of connections 112. As used herein, a "plurality of" items means two or more items. Further, a "number of" items means one or more items. For example, plurality of transport members 110 means two or more transport members, while number of connections 112 means one or more connections.

As used herein, a "transport member," such as one of plurality of transport members 110, may be any structural member having a channel through which materials may be moved. Depending on the implementation, a transport member in plurality of transport members 110 may take the form of, for example, a tube, a duct, a cylinder, a pipe, a pipeline, a conduit, or some other type of structure having a channel through which materials may flow. As one illustrative example, plurality of transport members 110 may take the form of plurality of tubes 111.

Further, as used herein, a "connection," such as one of number of connections 112, may be any type of permanent or removable physical connection between two or more transport members in plurality of transport members 110. Depending on the implementation, a connection in number of connections 112 may comprise any number of components such as, for example, without limitation, fasteners, joint elements, screws, ferrules, rings, seals, adhesive bonds, and/or other types of components.

As one illustrative example, number of connections 112 may take the form of number of coupling assemblies 113. Each coupling assembly in number of coupling assemblies 113 may be configured to couple a transport member in plurality of transport members 110 with another transport member in plurality of transport members 110. In this manner, when plurality of transport members 110 takes the form of plurality of tubes 111, number of coupling assemblies 113 may be used to couple tubes in plurality of tubes 111 to each other.

As used herein, a first component, such as a tube, "coupled" to a second component, such as another tube, means that the first component is connected to or fastened to the second component. This connection may be a direct connection or an indirect connection. For example, an end of one tube may be coupled to the end of another tube using a coupling assembly. With a direct connection, the end of the tube may come into contact with the end of the other tube when these two ends are coupled. With an indirect connection, the end of the tube and the end of the other tube may not contact each other when these two ends are coupled.

Of course, in other illustrative examples, number of connections 112 may take other forms. For example, transport members may be attached to each other using other methods, such as, for example, applying adhesives to permanently connect transport members or performing thermoplastic welding operations.

In these illustrative examples, fluid transport system 100 is configured such that fluid transport system 100 has selected electrical configuration 114. Selected electrical configuration 114 may be comprised of set of electrical properties 116, each having a value within a selected range. As used herein, a "set of" items means one or more items.

Set of electrical properties 116 may include, for example, resistance, resistivity, conductivity, and/or other types of electrical properties. Further, in some cases, any component that makes up fluid transport system 100 may be configured such that the component also has a set of electrical properties with values within selected ranges.

Selected electrical configuration 114 may be selected such that an intensity of electrical discharge that occurs within fluid transport system 100 during operation of aerospace vehicle 106 may be reduced to within selected tolerances. In particular, selected electrical configuration 114 may be selected such that voltages and currents, induced within fluid transport system 100 in response to an electromagnetic event such as lighting, may be constrained to within selected tolerances. Still further, selected electrical configuration 114 may be selected to allow dissipation of electrostatic charge that may build up along plurality of transport members 110 during operation of aerospace vehicle 106.

Figure 2:
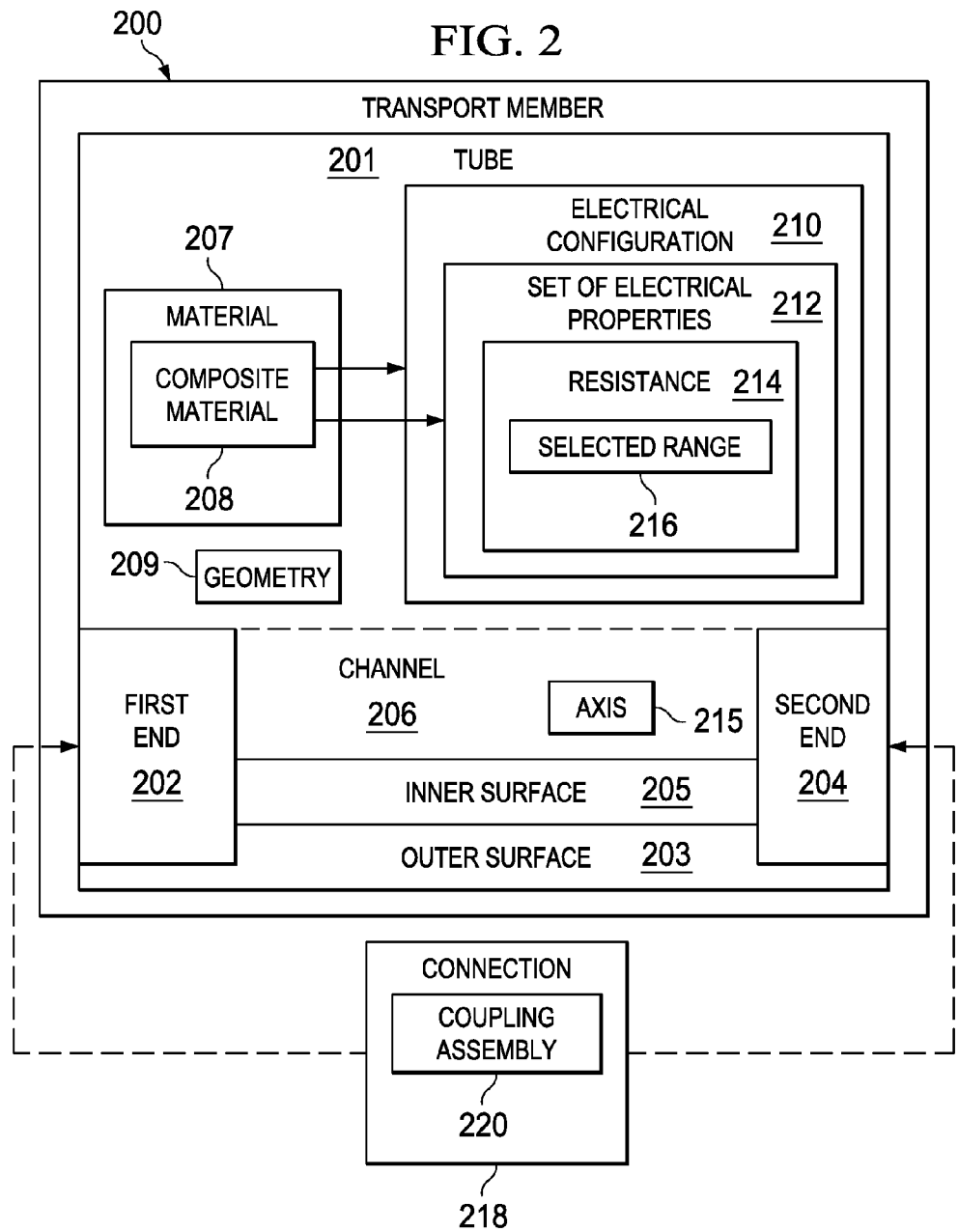
FIG. 2 is an illustration of a transport member in the form of a block diagram in accordance with an illustrative embodiment.

Turning now to FIG. 2, an illustration of a transport member in plurality of transport members 110 from FIG. 1 in the form of a block diagram is depicted in accordance with an illustrative embodiment. Transport member 200 in FIG. 2 is an example of one implementation for a transport member in plurality of transport members 110 in FIG. 1. In one illustrative example, transport member 200 takes the form of tube 201. Tube 201 may be an example of one implementation for a tube in plurality of tubes 111 in FIG. 1.

As depicted, transport member 200 has first end 202 and second end 204. Further, transport member 200 has outer surface 203 and inner surface 205. Inner surface 205 may form channel 206 that extends along axis 215 through transport member 200 from first end 202 of transport member 200 to second end 204 of transport member 200. Axis 215 may be a center axis that extends through transport member 200 from first end 202 of transport member 200 to second end 204 of transport member 200. Fluid 102 from FIG. 1 may be carried within channel 206.

In these illustrative examples, connection 218 may be an example of a connection in number of connections 112 that may be used to connect transport member 200 to another transport member in plurality of transport members 110 in FIG. 1. As depicted, connection 218 may be used at either first end 202 of transport member 200 or second end 204 of transport member 200 to connect transport member 200 to another transport member.

In one illustrative example, connection 218 takes the form of coupling assembly 220. Coupling assembly 220 may comprise any number of components such as, for example, without limitation, fasteners, joint elements, screws, ferrules, rings, seals, and/or other types of components.

In these illustrative examples, transport member 200 may be comprised of material 207. Material 207 may be selected such that transport member 200 has electrical configuration 210. Electrical configuration 210 may comprise set of electrical properties 212, each having a value within a selected range. In one illustrative example, set of electrical properties 212 includes resistance 214. Resistance 214 may be electrical resistance in these examples.

As used herein, the "resistance" of an item, such as transport member 200, is the opposition of the item to the flow of electric current through the item. In this manner, resistance 214 of transport member 200 may be the opposition of transport member 200 to the flow of electric current through transport member 200.

Material 207 may be selected such that resistance 214 is within selected range 216. Selected range 216 for resistance 214 may be selected such that resistance 214 is sufficiently high to limit the voltages and currents, induced along transport member 200 in response to an electromagnetic event, to within selected tolerances. The electromagnetic event may be, for example, a lightning strike, a short circuit, an overloaded circuit, an electrical field, or some other type of electromagnetic event.

In particular, material 207 may be selected such that the induced voltages and currents may be limited to levels at or below the level at which an undesired electrical discharge may be formed. The undesired electrical discharge may be, for example, an arc between transport member 200 and a structure and/or a spark in connection 218 having at least one property outside of selected tolerances.

In one illustrative example, when transport member 200 is installed within a particular specified electromagnetic environment, selected range 216 for resistance 214 of transport member 200 may be selected such that the per unit length resistance 214 of transport member 200 is at or above about 100 kilohms per meter (k$\Omega$/m). For example, when transport member 200 is installed in a fuel tank of an aircraft comprised of carbon fiber reinforced plastic, the specified electromagnetic environment may be a specified lightning environment.

Further, when transport member 200 is configured to allow static dissipation and reduce and/or prevent the build-up of electrostatic charge, selected range 216 for resistance 214 of transport member 200 may be selected such that the per unit length resistance 214 of transport member 200 is at or below about 100 megohms per meter (M$\Omega$/m).

Material 207 may take a number of different forms. Material 207 may comprise, for example, without limitation, non-metallic fiber reinforced composite materials, plastic materials, and/or other suitable types of non-homogeneous metallic materials. In one illustrative example, material 207 takes the form of composite material 208 comprised of any number of non-metallic materials. When comprised of composite material 208, transport member 200 may be referred to as a composite transport member. In this manner, tube 201 may be referred to as a composite tube.

In this manner, selected range 216 may include levels of resistance 214 sufficiently low to provide static dissipation. Further, selected range 216 may include levels of resistance 214 sufficiently high to limit the voltages and currents induced along transport member 200 in response to an electromagnetic event.

Further, in these illustrative examples, resistance 214 of transport member 200 may vary along axis 215. However, composite material 208 may be selected such that resistance 214 does not vary outside of selected tolerances. For example, transport member 200 may be formed using composite material 208 selected such that resistance 214 of transport member 200 may vary only by less than a selected percentage over the length of the transport member and time with respect to axis 215. This selected percentage may be between about 20 percent and about 40 percent in one illustrative example.

In one illustrative example, each transport member in plurality of transport members 110 in FIG. 1 may be implemented in a manner similar to transport member 200. Resistance within selected range 216 may be distributed evenly over individual intervals of length of tubing installed in fluid transport system 100 in FIG. 1.

When fluid transport system 100 takes the form of fuel system 105 in FIG. 1 located in a fuel tank, the distributed high electrical resistance may keep the electromagnetic fields inside the fuel tank induced by lightning from being concentrated, thereby reducing the voltages and currents induced along the tubing. The per unit length resistance with respect to particular lengths of tubing in fuel system 105 may be different between different length intervals, but evenly distributed within these length intervals.

Figure 3:
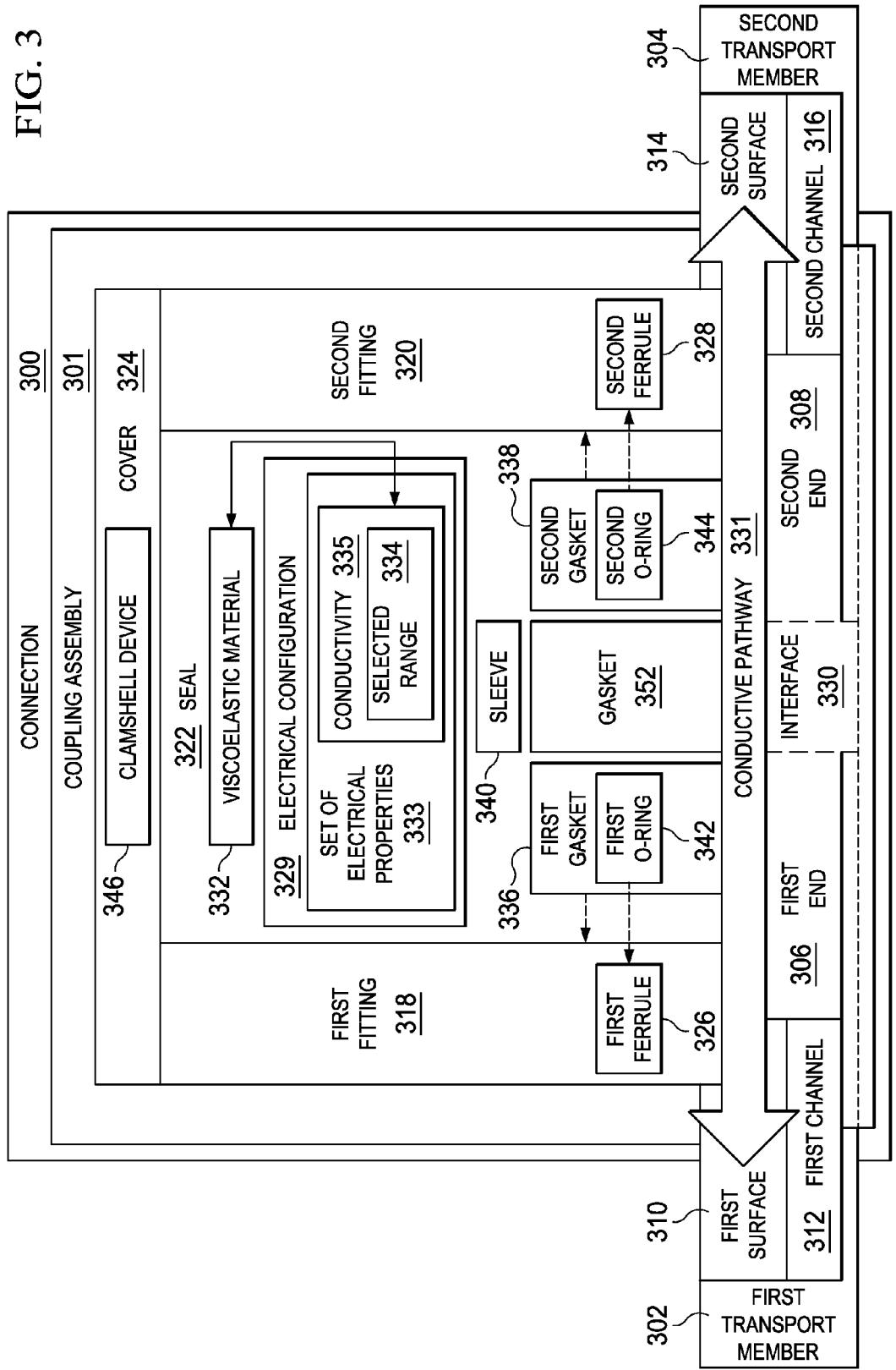
FIG. 3 is an illustration of a connection in the form of a block diagram in accordance with an illustrative embodiment.

With reference now to FIG. 3, an illustration of a connection in number of connections 112 from FIG. 1 in the form of a block diagram is depicted in accordance with an illustrative embodiment. Connection 300 is an example of one implementation for a connection in number of connections 112 in FIG. 1. Connection 300 may take the form of coupling assembly 301. Coupling assembly 301 may be an example of one implementation for a coupling assembly in number of coupling assemblies 113 in FIG. 1.

In some cases, connection 300 may be used to implement connection 218 in FIG. 2. For example, coupling assembly 301 may be used to implement coupling assembly 220 in FIG. 2.

As depicted, connection 300 is used to couple first transport member 302 with second transport member 304. In particular, first end 306 of first transport member 302 is coupled to second end 308 of second transport member 304 using connection 300. First transport member 302 has first surface 310 and first channel 312. Second transport member 304 has second surface 314 and second channel 316.

First channel 312 and second channel 316 may be configured to allow different types of materials to flow through first transport member 302 and second transport member 304, respectively. These materials may include any number of liquid materials, gaseous materials, and/or solid materials. In one illustrative example, first transport member 302 and second transport member 304 may be a first fuel transport member and a second fuel transport member, respectively, through which fuel 108 from FIG. 1 is allowed to flow.

When first end 306 of first transport member 302 is coupled to second end 308 of second transport member 304, material may flow between first channel 312 within first transport member 302 and second channel 316 within second transport member 304. In this manner, first channel 312 and second channel 316 may form a channel that extends through both first transport member 302 and second transport member 304 when first transport member 302 and second transport member 304 are coupled to each other.

In these illustrative examples, connection 300 may be configured such that the electrical resistance across connection 300 is less than the electrical resistance through a specified length of first transport member 302 and through a specified length of second transport member 304. This specified length may be, for example, without limitation, about one foot (ft) or about one third of a meter (m) when connection 300 is implemented within a fuel tank in an aircraft comprised of carbon fiber reinforced plastic. In particular, this specified length may apply when first transport member 302, second transport member 304, and connection 300 are comprised of similarly non-metallic highly electrically resistive materials.

In this manner, each of the individual components that make up connection 300 may be configured such that the electrical resistance across connection 300 is less than the electrical resistance through the specified length of first transport member 302 and through the specified length of second transport member 304. The components that make up connection 300 may be comprised of any number of materials including, but not limited to, metal, plastic, a composite material, and/or other types of materials.

If components having an electrical resistance outside of the selected range are used in forming connection 300, the size and/or placement of these pieces relative to first transport member 302 and second transport member 304 may have restrictions. As one illustrative example, if a piece of metal having an electrical resistance outside of the selected range is used, the piece may need to have electrical ground paths to and through first transport member 302, second transport member 304, and/or other transport members. This type of grounding may allow static dissipation from tube to tube through the piece of metal and from the piece of metal to ground through one of the tubes.

In one illustrative example, connection 300 may include first fitting 318, second fitting 320, seal 322, and cover 324. First fitting 318 and second fitting 320 are associated with first end 306 of first transport member 302 and second end 308 of second transport member 304, respectively. In particular, first fitting 318 is associated with first surface 310 of first transport member 302 at first end 306 of first transport member 302. Further, second fitting 320 is associated with second surface 314 of second transport member 304 at second end 308 of second transport member 304.

When one component is "associated" with another component, as used herein, this association is a physical association. For example, a first component, such as first fitting 318, may be considered to be associated with a second component, such as first transport member 302, by being secured to the second component, bonded to the second component, mounted to the second component, welded to the second component, fastened to the second component, and/or connected to the second component in some other suitable manner. The first component also may be connected to the second component using a third component. Additionally, the first component may also be considered to be associated with the second component by being formed as part of and/or an extension of the second component.

In one illustrative example, first fitting 318 takes the form of first ferrule 326, and second fitting 320 takes the form of second ferrule 328. As used herein, a "ferrule," such as first ferrule 326 and second ferrule 328, is a ring-type object used for fastening, joining, and/or reinforcement. A ferrule may take the form of a ring, a bracelet, a sleeve, a circular clamp, a spike, a band, or some other suitable type of object.

First ferrule 326 is placed around first surface 310 of first transport member 302 at first end 306 of first transport member 302. Second ferrule 328 is placed around second surface 314 of second transport member 304 at second end 308 of second transport member 304.

In these illustrative examples, seal 322 is configured for placement around first fitting 318 and second fitting 320 when first end 306 of first transport member 302 is positioned relative to second end 308 of second transport member 304. For example, seal 322 may be placed around first end 306 and second end 308 when first end 306 is positioned against second end 308.

Seal 322 is configured to seal interface 330 formed between first end 306 of first transport member 302 and second end 308 of second transport member 304 when first end 306 of first transport member 302 and second end 308 of second transport member 304 are positioned relative to each other. Sealing interface 330 means reducing the possibility of material flowing into and/or out of the channel formed by first channel 312 within first transport member 302 and second channel 316 within second transport member 304 at interface 330 when first transport member 302 is coupled to second transport member 304.

In some illustrative examples, seal 322 may be configured such that connection 300 has electrical configuration 329. Electrical configuration 329 comprises set of electrical properties 333, each having a value within a selected range. Electrical configuration 329 for connection 300 may be selected such that connection 300 forms conductive pathway 331 between first transport member 302 and second transport member 304.

Conductive pathway 331 may be a pathway that allows an electrical current to flow between first transport member 302 and second transport member 304. In other words, conductive pathway 331 allows an electrical current to be conducted between first transport member 302 and second transport member 304. For example, electrical currents flowing through first surface 310 of first transport member 302 may be conducted to second surface 314 of second transport member 304 when conductive pathway 331 is present. In this manner, electrostatic charge may be dissipated using conductive pathway 331 formed by connection 300.

In an illustrative example, at least a portion of seal 322 comprises viscoelastic material 332. Viscoelastic material 332 is a material that comprises both viscous and elastic properties. A viscous material is a material that is resistant to being deformed by shear forces. An elastic material is a material that can return to its original shape after the stress that caused deformation of the material is no longer applied.

In these illustrative examples, viscoelastic material 332 is nonmetallic. Further, viscoelastic material 332 may be selected such that viscoelastic material 332 has a level of conductivity 335 within selected range 334 in these examples.

Selected range 334 may be selected such that conductive pathway 331 is formed between first transport member 302 and second transport member 304 when first transport member 302 is coupled to second transport member 304 using connection 300. In this illustrative example, selected range 334 may include levels of conductivity sufficiently high to allow electrostatic charge that builds up on first transport member 302 and/or second transport member 304 to be dissipated through seal 322.

However, in some cases, selected range 334 may also include levels of conductivity sufficiently low to reduce voltages and currents, induced in response to an electromagnetic event, such as, for example, lightning, along first transport member 302 and/or second transport member 304.

For example, selected range 334 may be between about $1 \times 10^{-4}$ Siemens/centimeters (S/cm) and about $1 \times 10^{-9}$ Siemens/centimeters (S/cm). Of course, in other illustrative examples, selected range 334 may be a particular level of conductivity between about $1 \times 10^{-4}$ Siemens/centimeters and about $1 \times 10^{-9}$ Siemens/centimeters. Of course, in other illustrative examples, the upper limit and/or lower limit for selected range 334 may be different, depending on the particular implementation for seal 322.

Selected range 334 of conductivity 335 may also be the range selected for the conductivity of other components within connection 300, first transport member 302, and/or second transport member 304. Further, first transport member 302, second transport member 304, first fitting 318, second fitting 320, seal 322, and cover 324 may together have a level of conductivity that is within selected range 334.

Conductivity is related to resistivity. The resistivity of an item is the ability of that item to prevent an electrical current from being conducted through the item. In particular, conductivity is the reciprocal of resistivity. As the conductivity of an item increases, the resistivity of the item decreases. Similarly, as the conductivity of an item decreases, the resistivity of the item increases. Selected range 334 for conductivity 335 corresponds to a range for resistivity between about $1 \times 10^{4}$ ohms-centimeters ($\Omega$-cm) and about $1 \times 10^{9}$ ohms-centimeters ($\Omega$-cm).

Viscoelastic material 332 may be selected from any number of materials configured to provide a level of conductivity 335 within selected range 334. For example, viscoelastic material 332 may comprise at least one of a conductive elastomer, a conductive rubber, a conductive silicone material, and other suitable types of materials. An elastomer is a polymer that is viscoelastic.

As used herein, the phrase "at least one of," when used with a list of items, means different combinations of one or more of the listed items may be used and only one of each item in the list may be needed. For example, "at least one of item A, item B, and item C" may include, without limitation, item A or item B and item B. This example also may include item A, item B, and item C, or item B and item C. In other examples, "at least one of" may be, for example, without limitation, two of item A, one of item B, and 30 of item C; four of item B and seven of item C; or some other suitable combination.

In these illustrative examples, seal 322 comprises first gasket 336, second gasket 338, and sleeve 340. As used herein, a "gasket," such as first gasket 336 and second gasket 338, is a mechanical seal. In one illustrative example, first gasket 336 takes the form of first O-ring 342, and second gasket 338 takes the form of second O-ring 344. As used herein, an "O-ring," such as first O-ring 342 and second O-ring 344, is a mechanical gasket in the shape of a torus. Further, an O-ring has a loop-type shape.

Of course, in other illustrative examples, first gasket 336 and second gasket 338 may take some other suitable form. For example, in some cases, first gasket 336 and second gasket 338 may be configured such that a cross-section of these gaskets has a triangular shape, a square shape, a rectangular shape, an oval shape, or some other suitable type of shape.

First O-ring 342 and second O-ring 344 are configured to be received by first fitting 318 and second fitting 320, respectively. As one illustrative example, first O-ring 342 may fit into a groove around first fitting 318, and second O-ring 344 may fit into a groove around second fitting 320.

Sleeve 340 is then placed around first O-ring 342 and second O-ring 344 to apply pressure to first O-ring 342 and second O-ring 344. This pressure compresses first O-ring 342 and second O-ring 344 and causes these O-rings to seal interface 330 between first end 306 of first transport member 302 and second end 308 of second transport member 304.

Additionally, in some illustrative examples, cover 324 may be placed over seal 322, at least a portion of first fitting 318, and at least a portion of second fitting 320. Cover 324 may be used to cover seal 322 and hold seal 322 in place. In one illustrative example, cover 324 takes the form of clamshell device 346.

When interface 330 has been sealed using seal 322, conductive pathway 331 is formed between first transport member 302 and second transport member 304. As one illustrative example, first O-ring 342 and second O-ring 344 may be comprised of viscoelastic material 332 having a level of conductivity within selected range 334. Further, each of first fitting 318, second fitting 320, and sleeve 340 may be comprised of a nonmetallic material having a level of conductivity within selected range 334.

In this illustrative example, conductive pathway 331 may be formed through first transport member 302, through first fitting 318, through first O-ring 342, through sleeve 340, through second O-ring 344, through second fitting 320, and through second transport member 304. When conductive pathway 331 is formed, an electrical current may flow in one of a first direction and a second direction.

The first direction may be from first transport member 302, through first fitting 318, through first O-ring 342, through sleeve 340, through second O-ring 344, through second fitting 320, and to second transport member 304. The second direction may be from second transport member 304, through second fitting 320, through second O-ring 344, through sleeve 340, through first O-ring 342, through first fitting 318, and to first transport member 302.

In this manner, electrical currents induced by electrostatic charge that builds up on first surface 310 of first transport member 302 and/or second surface 314 of second transport member 304 may be dissipated using conductive pathway 331. In particular, with connection 300 coupling first transport member 302 and second transport member 304, first transport member 302 and second transport member 304 may be considered grounded to each other.

In other words, an electrical current flowing into first transport member 302 may flow into second transport member 304 through coupling assembly 301 without interruption and without the level of the electrical current changing outside of selected tolerances. Similarly, an electrical current flowing into second transport member 304 may flow into first transport member 302 through coupling assembly 301 without interruption and without the level of the electrical current changing outside of selected tolerances.

In some cases, the electrical current traveling along conductive pathway 331 may be electrical current induced in response to an electromagnetic event such as, for example, a lightning strike. Selected range 334 of conductivity 335 may be selected such that the voltage drop across first O-ring 342 and the voltage drop across second O-ring 344 when this type of electrical current travels through first O-ring 342 and second O-ring 344, respectively, is reduced to within selected tolerances.

In these illustrative examples, first transport member 302 and second transport member 304 may be fuel tubes in, for example, fuel system 105 in aerospace vehicle 106 in FIG. 1. In some cases, fuel system 105 may be configured such that fuel system 105 has an overall level of conductivity within selected range 334. Different portions of fuel system 105 may have different levels of conductivity and different ranges which apply to different portions of the fuel system. Some portions of the system may not be required to be within the range of conductivity specified. The one or more levels of conductivity within selected range 334 may be lower than the levels of conductivity for other portions of aerospace vehicle 106. For example, fuel system 105 may have a level of conductivity between about $1\times10^{-4}$ Siemens/centimeters and about $1\times10^{-9}$ Siemens/centimeters. However, one or more other portions of aerospace vehicle 106 may have a level of conductivity above about $1\times10^{-4}$ Siemens/centimeters.

In this manner, fluid transport system 100 in FIG. 1 having plurality of transport members 110, each implemented in a manner similar to transport member 200 in FIG. 2, and number of connections 112, each implemented in a manner similar to connection 300 in FIG. 3, may be configured to reduce electrical discharge within fluid transport system 100. Plurality of transport members 110, interconnected within fluid transport system 100 may have high electrical resistance levels substantially evenly distributed throughout this interconnected system of tubing.

In particular, the voltages and currents induced by lightning may be reduced and/or limited such that the energy imparted to the electrical discharge may be reduced. In this manner, the undesired effects of electrical discharge within fluid transport system 100 may be reduced and/or prevented. In particular, the overall energy supplied to the electrical discharge may be constrained to within selected tolerances.

In some cases, when implementing fluid transport system 100 comprising an interconnected network of high electrical resistance transport members, such as plurality of transport members 110, the network of transport members may need to be grounded to structure at one or more points for the purposes of removing electrostatic charge build-up and constraining the lightning-induced voltages to the transport members. The transport members also may need to be grounded at the penetrations of an enclosure encompassing an electrically shielded volume in which fluid transport system 100 is installed, such as a fuel tank, in order to reduce the possibility of a portion of an external electromagnetic environment such as lightning or an electrical fault, entering the volume.

Grounds made to structure for the purpose of removing electrical charge to prevent electrostatic charge from building up along the transport members may be located at one or more places in fluid transport system 100 as a means to ensure that an electrical path exists though fluid transport system 100 from any point in fluid transport system 100 to structure or ground with a sufficiently low resistance to dissipate the electrostatic charge at a fast enough rate to prevent static charge build up at the point. In an electrostatic charging environment such as a fuel tank on an aircraft, an acceptable electrical resistance for providing the capability to dissipate electrostatic charge from a point on a tube though a path to structure or ground may be a value at or below about 100 megohms ($M\Omega$).

In such case, grounds made for this purpose need only assure that this overall ground path resistance is accomplished. As such, a static ground resistance may be a value up to about 100 megohms ($M\Omega$) in the limiting case, but in the usual case a value up to about 10 $M\Omega$.

Grounds made to structure for the purpose of constraining the lightning induced voltages in the network of transport members in fluid transport system 100 may be located at one or more places in fluid transport system 100 as a means to ensure that the induced voltage from transport member to transport member and from transport member to structure at any point in fluid transport system 100 is less than a selected threshold. Grounds made to structure on the perimeter of a fuel tank for the purpose of shielding the fuel tank may be located at one or more places in the perimeter to prevent undesired voltages and currents from penetrating the fuel tank by means of conductive members to which said voltages and currents are induced by an external environment such as lightning outside the tank.

The illustrations of fluid transport system 100 in FIG. 1, transport member 200 in FIG. 2, and connection 300 in FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, transport member 200 may have additional features not depicted in FIG. 2. For example, without limitation, one or more structural features may extend into channel 206 from inner surface 205 of transport member 200. These structural features may need to be taken into account when measuring resistance 214 for transport member 200.

In other illustrative examples, seal 322 may comprise only gasket 352. Gasket 352 is configured to be placed around first fitting 318 and second fitting 320. Gasket 352 may have a shape configured for placement around first fitting 318 and second fitting 320. For example, gasket 352 may have a first end that fits into a groove around first fitting 318 and a second end that fits into a groove around second fitting 320 when first end 306 of first transport member 302 is positioned relative to second end 308 of second transport member 304. Further, gasket 352 may comprise viscoelastic material 332 having a level of conductivity within selected range 334.

With this type of configuration for seal 322 in connection 300, cover 324 is used to compress gasket 352 to seal interface 330 between first end 306 of first transport member 302 and second end 308 of second transport member 304, instead of sleeve 340. Further, with this configuration for seal 322, conductive pathway 331 is formed through first transport member 302, through first fitting 318, through gasket 352, through second fitting 320, and through second transport member 304.

In still other illustrative examples, seal 322 may include one or more gaskets in addition to first gasket 336 and second gasket 338. For example, seal 322 may also include a third O-ring configured for placement around first fitting 318 and a fourth O-ring configured for placement around second fitting 320.

These additional O-rings may be positioned such that cover 324 compresses the third O-ring and the fourth O-ring instead of sleeve 340. Further, the third O-ring and the fourth O-ring provide an additional conductive pathway. This additional conductive pathway is through first transport member 302, through first fitting 318, through the third O-ring, through cover 324, through the fourth O-ring, through second fitting 320, and through second transport member 304.

In some illustrative examples, first fitting 318 and/or second fitting 320 may not be considered part of connection 300. For example, when first fitting 318 and second fitting 320 are part of first transport member 302 and second transport member 304, respectively, these fittings may be considered separate from connection 300. In other illustrative examples, cover 324 may not be considered part of connection 300. For example, in some cases, connection 300 may include only seal 322.

Figure 4:
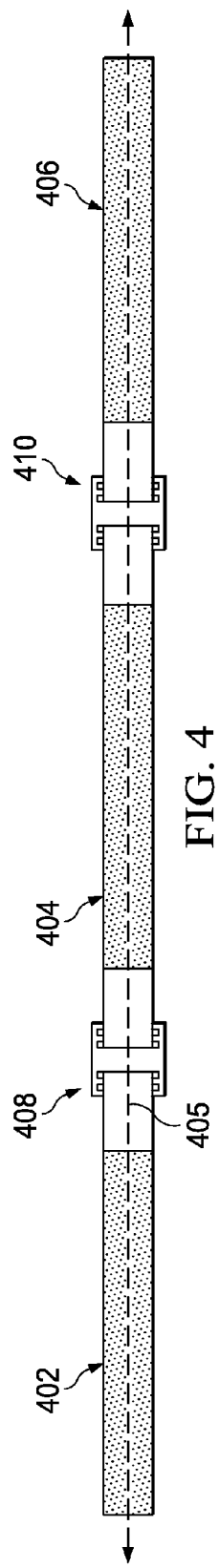
FIG. 4 is an illustration of tubes configured for use in a fluid transport system in accordance with an illustrative embodiment.

With reference now to FIG. 4, an illustration of tubes configured for use in a fluid transport system is depicted in accordance with an illustrative embodiment. In FIG. 4, tube 402, tube 404, and tube 406 may be configured for use in a fluid transport system, such as, for example, fluid transport system 100 in FIG. 1. In particular, tube 402, tube 404, and tube 406 are examples of implementations of tubes in plurality of tubes 111 in FIG. 1. Further, each of tube 402, tube 404, and tube 406 may be implemented in a manner similar to tube 201 in FIG. 2.

In this illustrative example, tube 402, tube 404, and tube 406 are comprised of non-metallic composite materials and configured to have a resistance within a selected range. This selected range may be between about 100 kilohms per meter to about 100 megohms per meter along axis 405 through tube 402, tube 404, and tube 406. With each of tube 402, tube 404, and tube 406 having a resistance within the selected range with respect to axis 405, the flow of an electric current, induced in response to an electromagnetic event around these tubes, though these tubes may be limited to within selected tolerances. Axis 405 is a center axis for tube 402, tube 404, and tube 406.

The illustration of tube 402, tube 404, and tube 406 in FIG. 4 are not meant to imply physical or architectural limitations to the manner in which an illustrative embodiment may be implemented. For example, in some cases, these tubes may be connected using other types of coupling assemblies other than coupling assembly 408 and coupling assembly 410.

With reference now to FIGS. 5-11, illustrations of different configurations for a coupling assembly are depicted in accordance with different illustrative embodiments. The components depicted in FIGS. 5-11 may be illustrative examples of how components shown in block form in FIG. 3 may be implemented as physical structures. The different components shown in FIGS. 5-11 may be combined with components in FIG. 3, used with components in FIG. 3, or a combination of the two.

Figure 5:
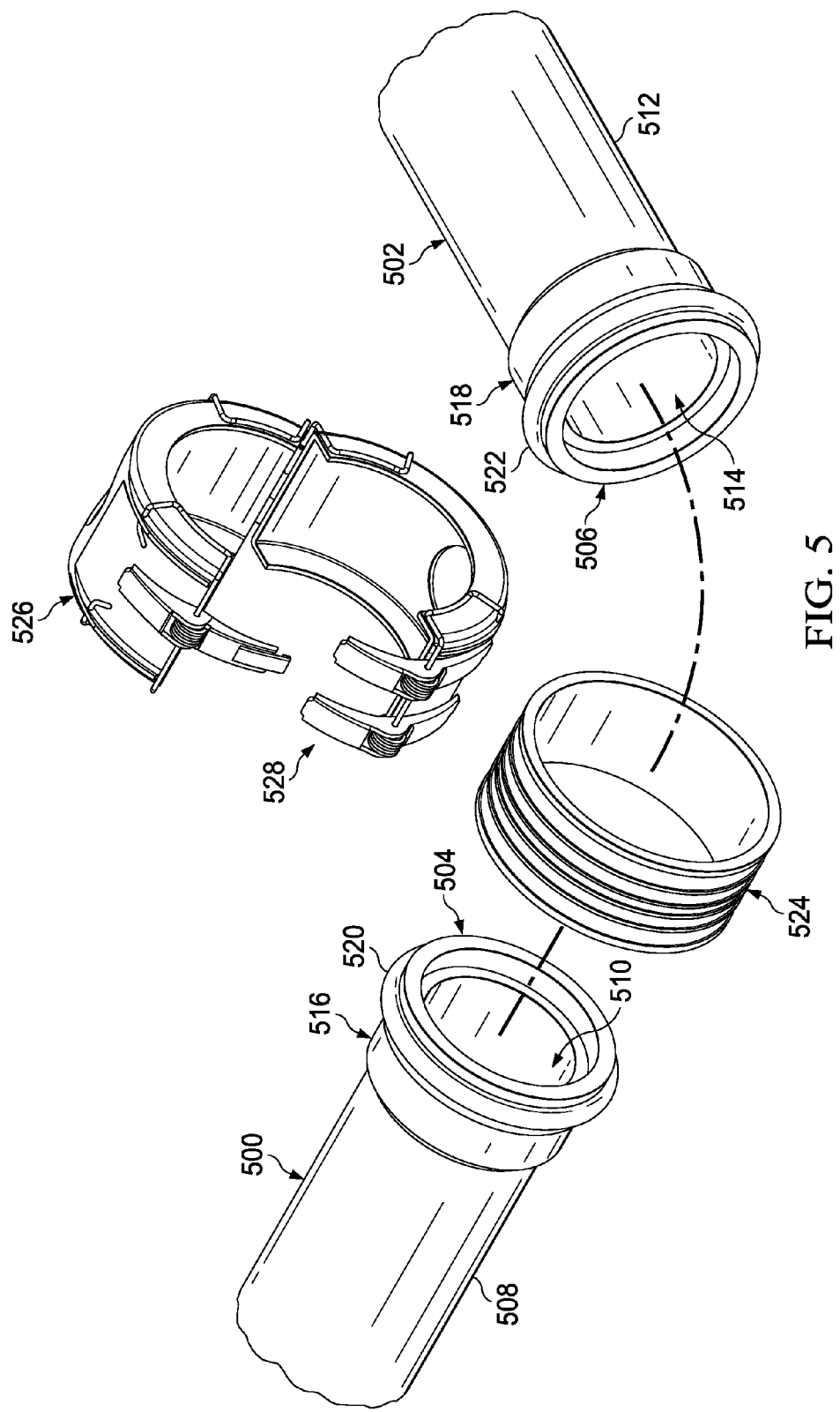
FIG. 5 is an illustration of components for a coupling assembly in accordance with an illustrative embodiment.

Turning now to FIG. 5, an illustration of components for a coupling assembly is depicted in accordance with an illustrative embodiment. In this illustrative example, components for a coupling assembly, such as coupling assembly 301 in FIG. 3, are depicted. These components may be assembled to form a coupling assembly configured to couple first tube 500 with second tube 502. First tube 500 and second tube 502 are examples of implementations for first transport member 302 and second transport member 304, respectively, in FIG. 3.

As depicted, first tube 500 has first end 504, and second tube 502 has second end 506. Further, first tube 500 has first surface 508 and first channel 510. Second tube 502 has second surface 512 and second channel 514.

First ferrule 516, second ferrule 518, first O-ring 520, second O-ring 522, sleeve 524, and clamshell device 526 are components that may be assembled to form coupling assembly 528. First ferrule 516 and second ferrule 518 are examples of implementations for first ferrule 326 and second ferrule 328, respectively, in FIG. 3. Further, sleeve 524 and clamshell device 526 are examples of implementations for sleeve 340 and clamshell device 346, respectively, in FIG. 3.

First ferrule 516, second ferrule 518, sleeve 524, and clamshell device 526 may be comprised of nonmetallic materials having a level of conductivity within a selected range. This range may be, for example, without limitation, between about $1 \times 10^{-4}$ Siemens/centimeters and about $1 \times 10^{-9}$ Siemens/centimeters. For example, first ferrule 516, second ferrule 518, sleeve 524, and clamshell device 526 may be comprised of composite materials. In particular, these components may be comprised of composite materials selected such that these components have a level of conductivity within the selected range.

First O-ring 520 and second O-ring 522 are examples of implementations for first O-ring 342 and second O-ring 344, respectively, in FIG. 3. In this illustrative example, each of first O-ring 520 and second O-ring 522 is comprised of a viscoelastic material, such as viscoelastic material 332 in FIG. 3. This viscoelastic material has a level of conductivity within, for example, without limitation, selected range 334 for conductivity 335 in FIG. 3.

As depicted, coupling assembly 528 has been partially assembled. In particular, first ferrule 516 has been placed around first surface 508 of first tube 500 at first end 504 of first tube 500. Second ferrule 518 has been placed around second surface 512 of second tube 502 at second end 506 of second tube 502. Further, first O-ring 520 has been placed around first ferrule 516, and second O-ring 522 has been placed around second ferrule 518. In this illustrative example, first O-ring 520 fits into a groove in first ferrule 516. Second O-ring 522 fits into a groove in second ferrule 518.

Figure 6:
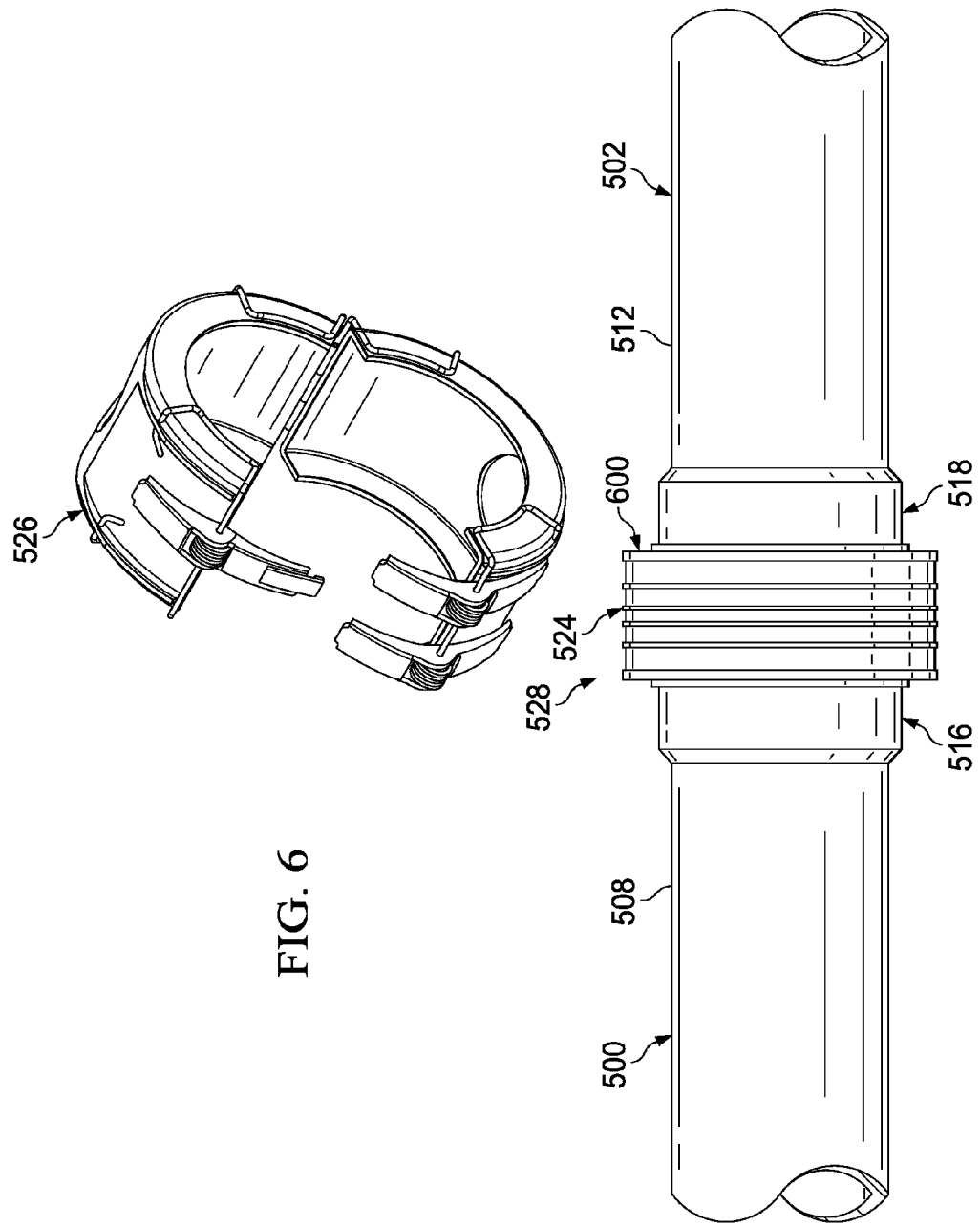
FIG. 6 is an illustration of a partially-assembled coupling assembly in accordance with an illustrative embodiment.

Turning now to FIG. 6, an illustration of a partially-assembled coupling assembly is depicted in accordance with an illustrative embodiment. In FIG. 6, sleeve 524 has been placed around first O-ring 520 and second O-ring 522 (not shown in this view) of coupling assembly 528 from FIG. 5.

When sleeve 524 is placed around these two O-rings, these O-rings are compressed by sleeve 524. Sleeve 524, first O-ring 520, and second O-ring 522 form seal 600 when first O-ring 520 and second O-ring 522 are compressed by sleeve 524. Seal 600 is an example of one implementation for seal 322 in FIG. 3.

Seal 600 seals the interface (not shown) between first end 504 (not shown) of first tube 500 and second end 506 (not shown) of second tube 502. Further, seal 600 forms a conductive pathway between first tube 500 and second tube 502. As depicted, coupling assembly 528 remains partially assembled without clamshell device 526.

Figure 7:
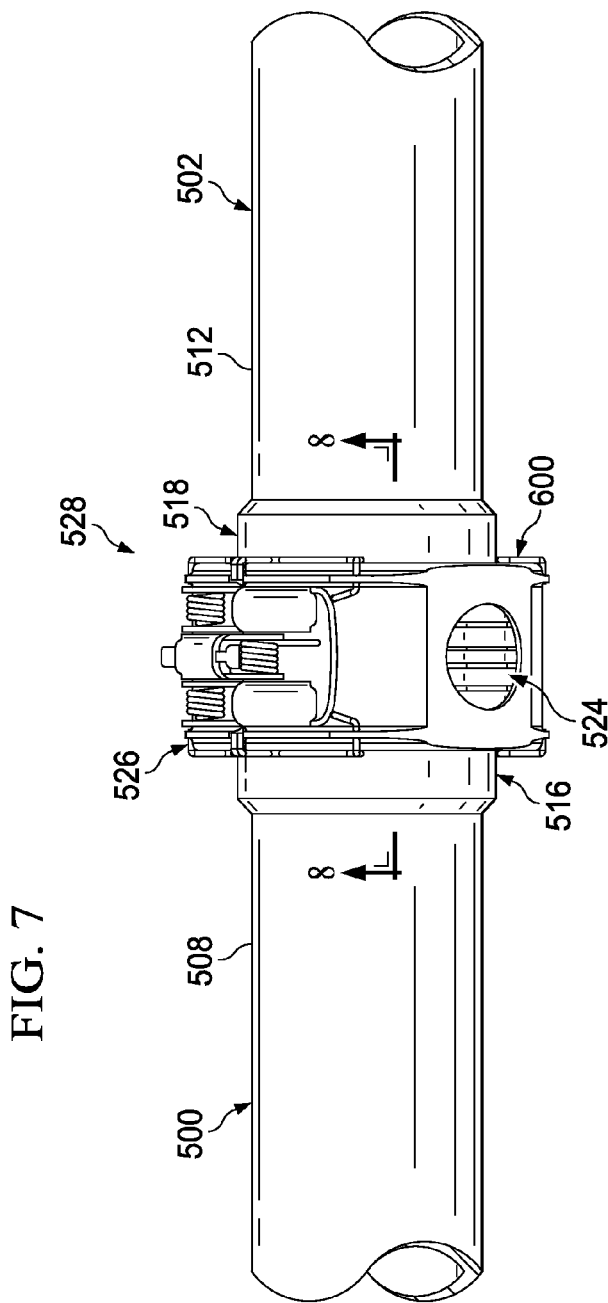
FIG. 7 is an illustration of a fully-assembled coupling assembly in accordance with an illustrative embodiment.

Turning now to FIG. 7, an illustration of a fully-assembled coupling assembly is depicted in accordance with an illustrative embodiment. In FIG. 7, coupling assembly 528 has been fully assembled. In particular, clamshell device 526 has been placed around seal 600 and at least a portion of first ferrule 516 and at least a portion of second ferrule 518 to form the fully-assembled coupling assembly 528.

Figure 8:
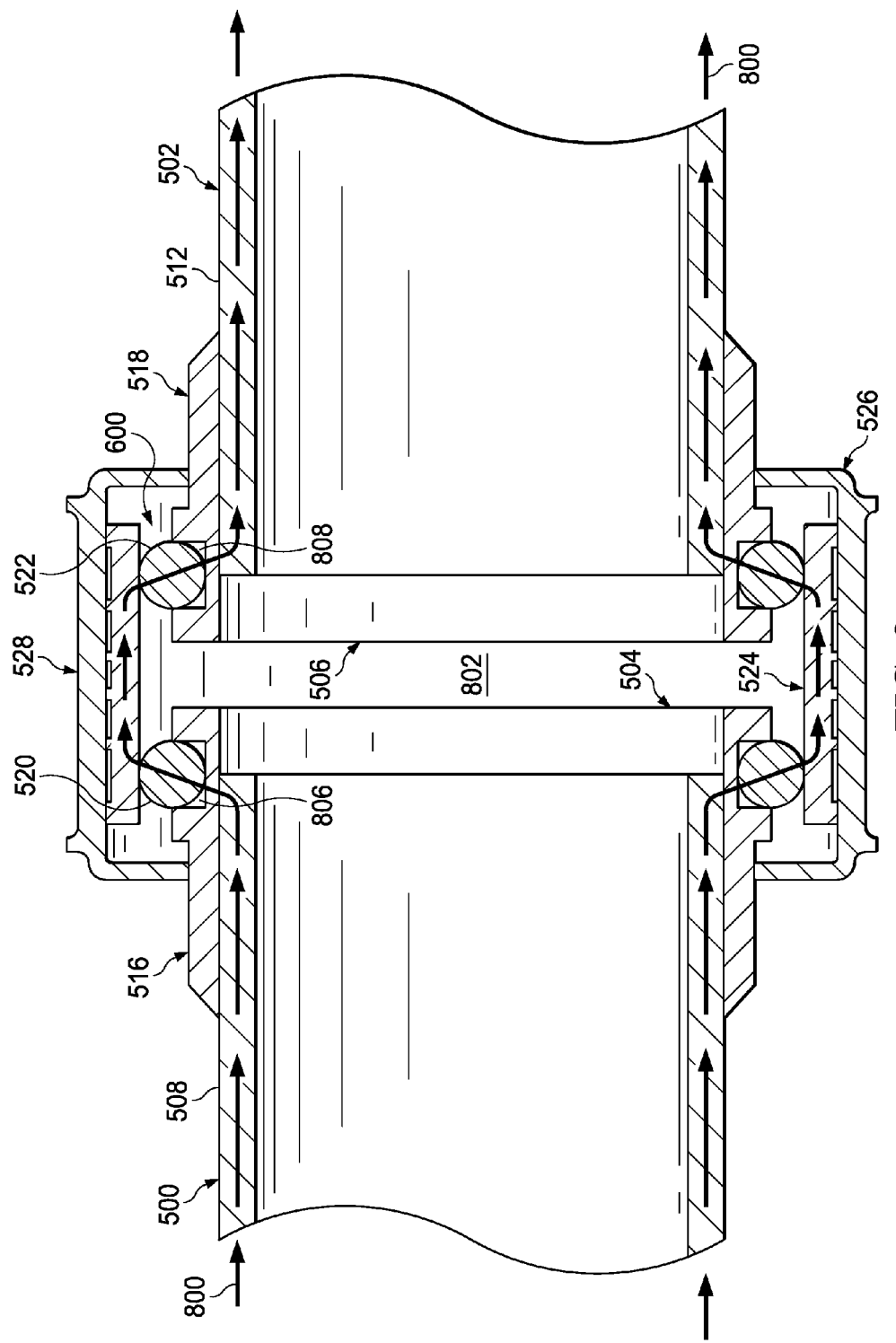
FIG. 8 is an illustration of a cross-sectional view of a coupling assembly in accordance with an illustrative embodiment.

With reference now to FIG. 8, an illustration of a cross-sectional view of a coupling assembly is depicted in accordance with an illustrative embodiment. In this illustrative example, a cross-sectional view of coupling assembly 528 in FIG. 7 taken along lines 8-8 is depicted.

As depicted, seal 600 forms conductive pathway 800 between first tube 500 and second tube 502. In particular, conductive pathway 800 is formed at interface 802 between first tube 500 and second tube 502. Interface 802 is between first end 504 of first tube 500 and second end 506 of second tube 502. First O-ring 520 fits within groove 806 of first ferrule 516. Second O-ring 522 fits within groove 808 of second ferrule 518.

In this illustrative example, conductive pathway 800 is formed through first surface 508 of first tube 500, first ferrule 516, first O-ring 520, sleeve 524, second O-ring 522, second ferrule 518, and second surface 512 of second tube 502. Conductive pathway 800 allows first tube 500, second tube 502, and coupling assembly 528 to function as a ground between the two tubes. At least one of first tube 500, second tube 502, and coupling assembly 528 may be connected to ground such that conductive pathway 800 may be considered as grounding these two tubes.

Figure 9:
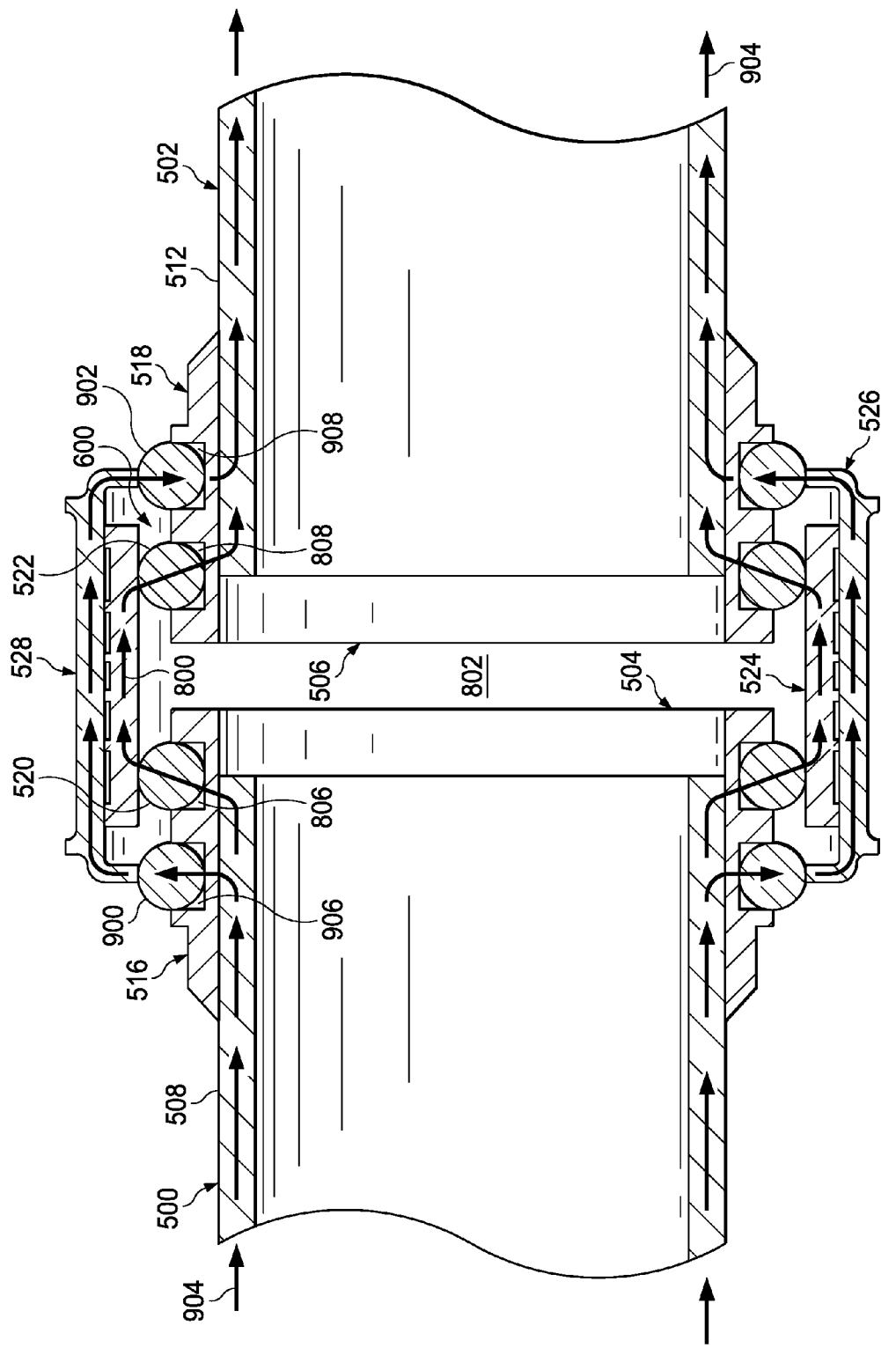
FIG. 9 is an illustration of a cross-sectional view of a different configuration for a coupling assembly in accordance with an illustrative embodiment.

With reference now to FIG. 9, an illustration of a cross-sectional view of a different configuration for a coupling assembly is depicted in accordance with an illustrative embodiment. In FIG. 9, coupling assembly 528 has a different configuration than the configuration for coupling assembly 528 in FIG. 8.

As depicted in FIG. 9, coupling assembly 528 includes third O-ring 900 and fourth O-ring 902 in addition to first O-ring 520 and second O-ring 522 in seal 600. Third O-ring 900 fits within groove 906 of first ferrule 516. Fourth O-ring 902 fits within groove 908 of second ferrule 518. Third O-ring 900 and fourth O-ring 902 could also be elastic or viscoelastic features that are not seals, but could be attached to clamshell device 526 to provide a conductive pathway as described below.

In this illustrative example, third O-ring 900 and fourth O-ring 902 allow seal 600 to form additional conductive pathway 904 between first tube 500 and second tube 502. In particular, additional conductive pathway 904 is formed through first surface 508 of first tube 500, first ferrule 516, third O-ring 900, clamshell device 526, fourth O-ring 902, second ferrule 518, and second surface 512 of second tube 502.

Figure 10:
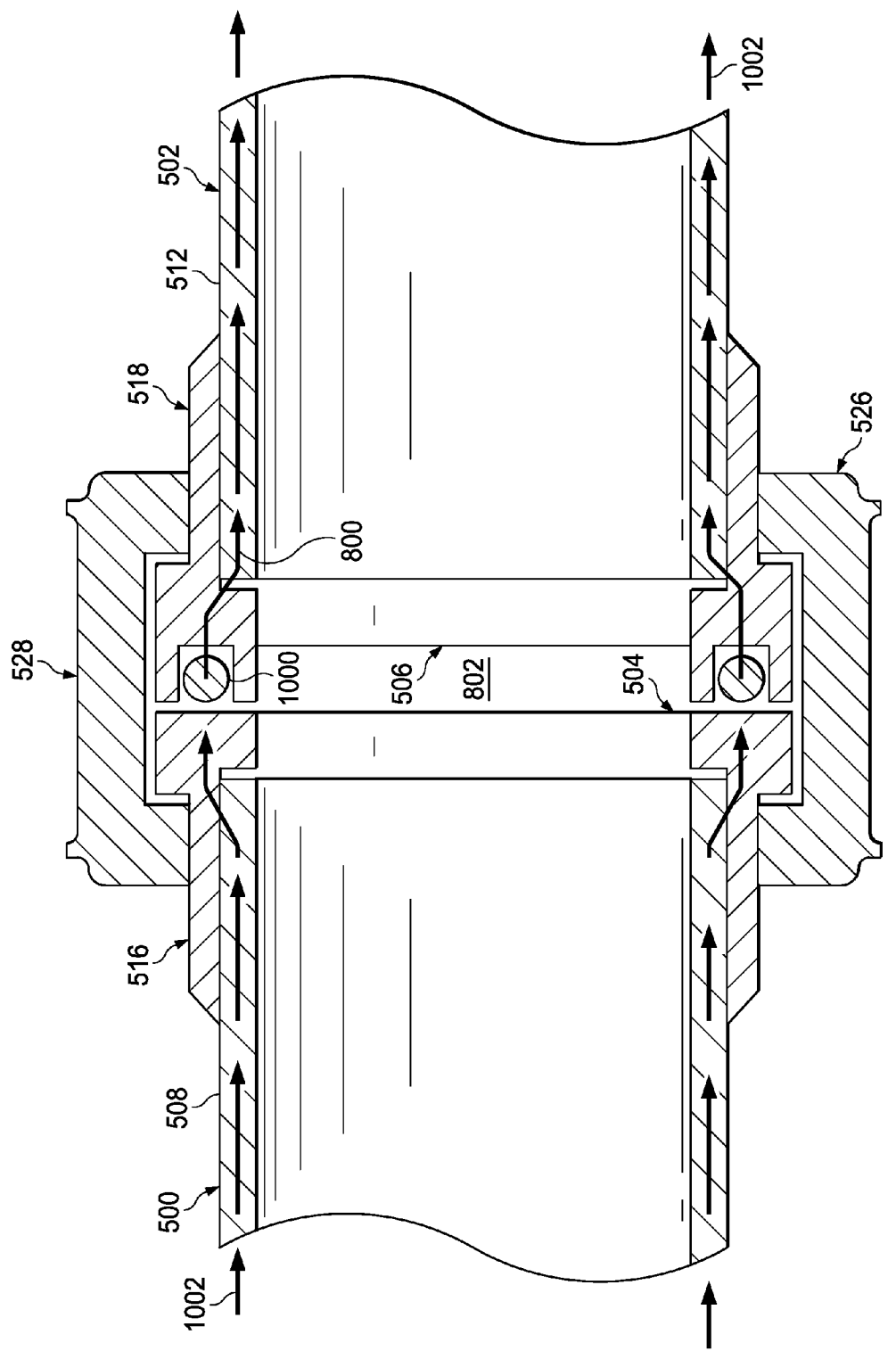
FIG. 10 is an illustration of a cross-sectional view of another configuration for a coupling assembly in accordance with an illustrative embodiment.

Turning now to FIG. 10, an illustration of a cross-sectional view of another configuration for a coupling assembly is depicted in accordance with an illustrative embodiment. In this illustrative example, seal 600 in coupling assembly 528 comprises only one O-ring instead of two O-rings. As depicted, seal 600 uses O-ring 1000 instead of both first O-ring 520 and second O-ring 522 in FIG. 8.

With this configuration for seal 600, conductive pathway 1002 is formed between first tube 500 and second tube 502. Conductive pathway 1002 is formed through first surface 508 of first tube 500, first ferrule 516, O-ring 1000, second ferrule 518, and second surface 512 of second tube 502. As depicted, electrical currents may also flow from first ferrule 516 into sleeve 524, and into second ferrule 518.

Figure 11:
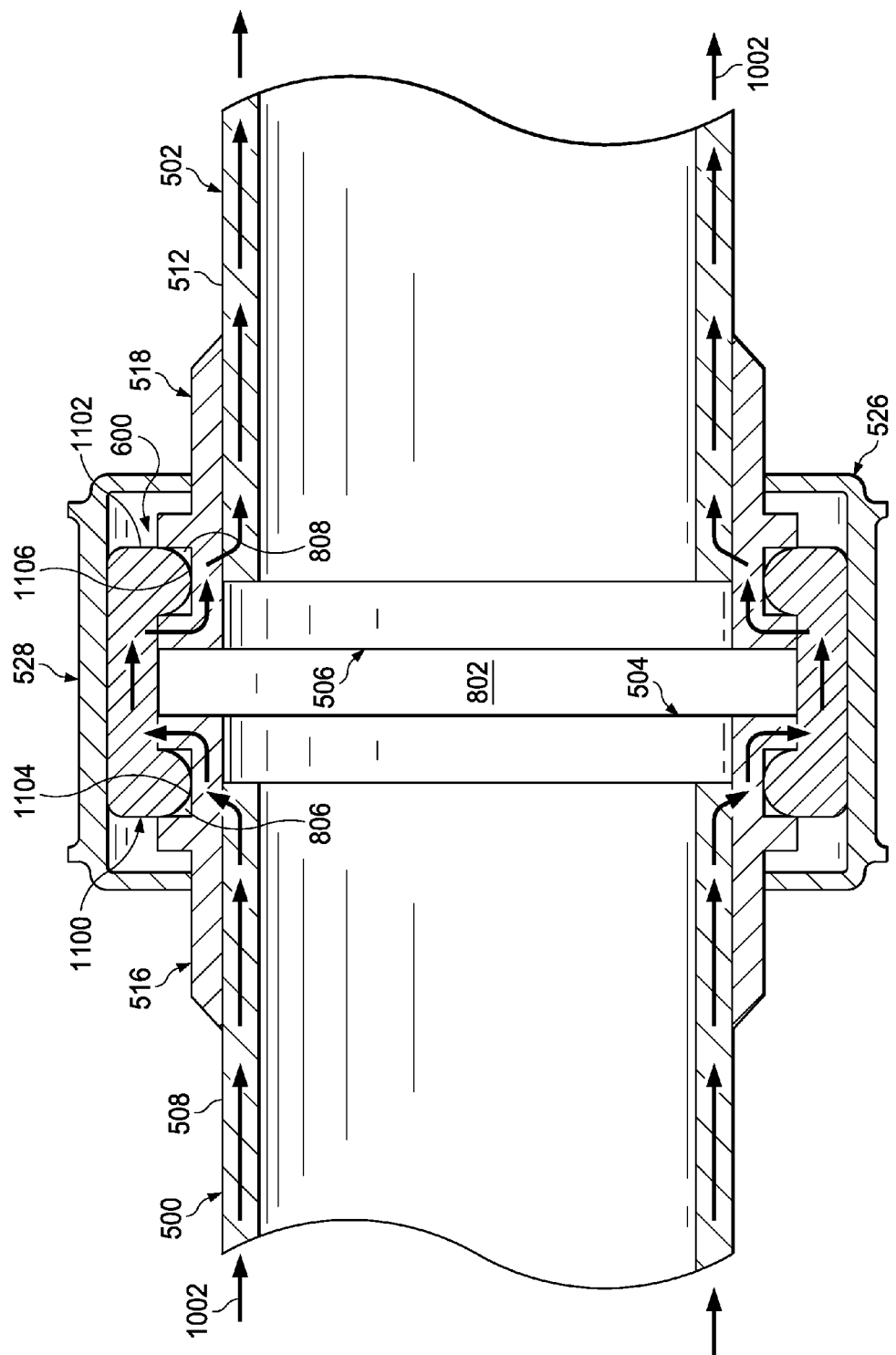
FIG. 11 is an illustration of a cross-sectional view of a different configuration for a coupling assembly in accordance with an illustrative embodiment.

Turning now to FIG. 11, an illustration of a cross-sectional view of a different configuration for a coupling assembly is depicted in accordance with an illustrative embodiment. In this illustrative example, seal 600 in coupling assembly 528 comprises gasket 1100. Further, seal 600 does not include sleeve 524 in this example.

As depicted, gasket 1100 has shape 1102. Shape 1102 is configured such that first end 1104 of gasket 1100 fits into groove 806 in first ferrule 516. Further, shape 1102 is configured such that second end 1106 of gasket 1100 fits into groove 808 in second ferrule 518. Clamshell device 526 may be used to compress gasket 1100 such that gasket 1100 forms seal 600 to seal interface 802 when clamshell device 526 is placed around seal 600.

In this illustrative example, gasket 1100 forms conductive pathway 1108 between first tube 500 and second tube 502. Conductive pathway 1108 is formed through first surface 508 of first tube 500, first ferrule 516, gasket 1100, second ferrule 518, and second surface 512 of second tube 502.

The illustrations of the different configurations for coupling assembly 528 in FIGS. 5-11 are not meant to imply physical or architectural limitations to the manner in which an illustrative embodiment may be implemented. Other components in addition to or in place of the ones illustrated may be used. Some components may be optional.

Figure 12:
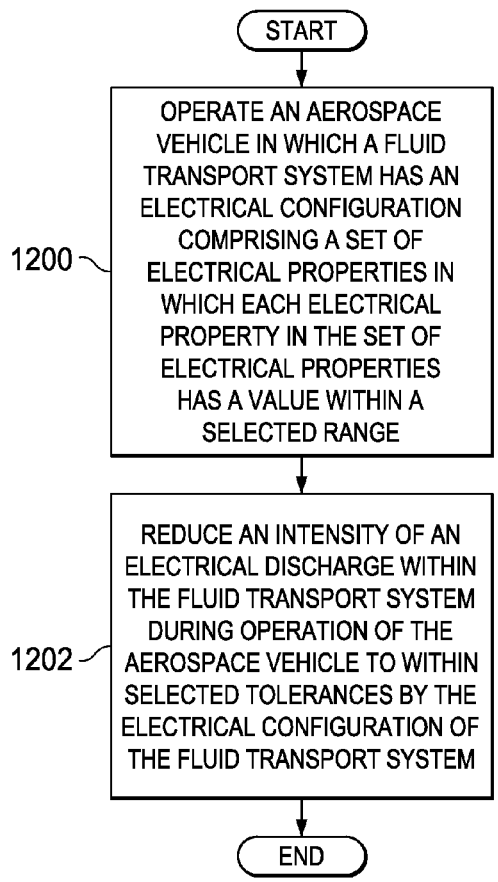
FIG. 12 is an illustration of a process for reducing an intensity of an electrical discharge within a fluid transport system in the form of a flowchart in accordance with an illustrative embodiment.

With reference now to FIG. 12, an illustration of a process for reducing an intensity of an electrical discharge within a fluid transport system in the form of a flowchart is depicted in accordance with an illustrative embodiment. The process illustrated in FIG. 12 may be implemented using fluid transport system 100 in FIG. 1. In this illustrative example, fluid transport system 100 may be configured for use in aerospace vehicle 106 in FIG. 1.

The process begins by operating the aerospace vehicle in which the fluid transport system has an electrical configuration comprising a set of electrical properties in which each electrical property in the set of electrical properties has a value within a selected range (operation 1200). The process may then reduce an intensity of an electrical discharge within the fluid transport system during operation of the aerospace vehicle to within selected tolerances by the electrical configuration of the fluid transport system (operation 1202), with the process terminating thereafter.

Figure 13:
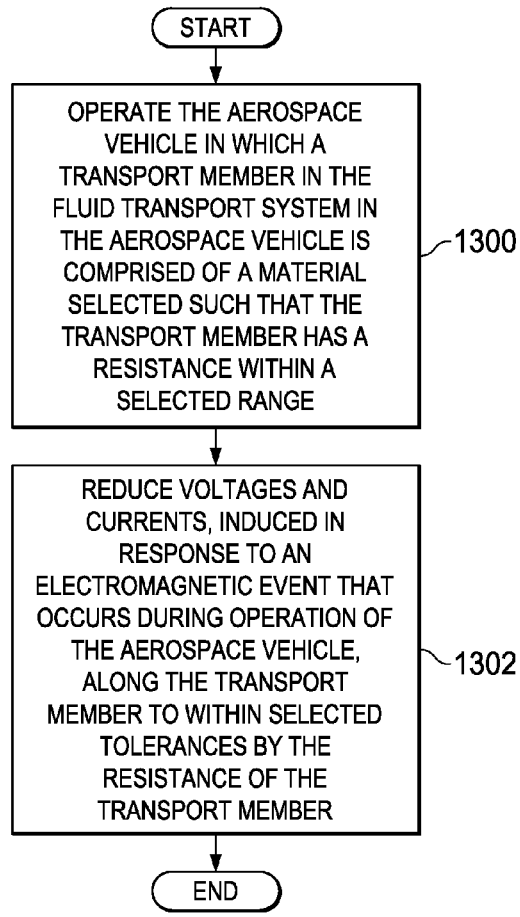
FIG. 13 is an illustration of a process for reducing the energy that can be supplied to an electrical discharge within a fluid transport system in the form of a flowchart in accordance with an illustrative embodiment.

With reference now to FIG. 13, an illustration of a process for reducing the energy that can be supplied to an electrical discharge within a fluid transport system in the form of a flowchart is depicted in accordance with an illustrative embodiment. The process illustrated in FIG. 13 may be implemented using fluid transport system 100 in FIG. 1. In particular, this process may be implemented using tube 201 in FIG. 2. Tube 201 may be configured for use in aerospace vehicle 106 in FIG. 1.

The process begins by operating the aerospace vehicle in which a transport member in the fluid transport system in the aerospace vehicle is comprised of a material selected such that the transport member has a resistance within a selected range (operation 1300). This selected range may include only electrical resistance levels above about 100 kilohms. Further, in some cases, this selected range may also only include electrical resistance levels below about 100 megohms.

The process may then reduce voltages and currents, induced in response to an electromagnetic event that occurs during operation of the aerospace vehicle, along the transport member to within selected tolerances by the resistance of the transport member (operation 1302), with the process terminating thereafter. Reducing these voltages and currents may reduce the energy that can be supplied to an electrical discharge within the fluid transport system. In this manner, this reduction of the induced voltages and currents may reduce the intensity of an electrical discharge that may occur within the fluid transport system.

With reference now to FIG. 14, an illustration of a process for dissipating electrostatic charge in the form of a flowchart is depicted in accordance with an illustrative embodiment. The process illustrated in FIG. 14 may be implemented using a coupling assembly, such as, for example, coupling assembly 301 in FIG. 3.

The process begins by operating the aerospace vehicle such that an electrostatic charge builds up on a surface of at least one of a first transport member and a second transport member in the fluid transport system in the aerospace vehicle (operation 1400). In one illustrative example, a first end of the first transport member may be coupled to a second end of the second transport member using a connection in the form of a coupling assembly comprising a first fitting, a second fitting, and a seal. The first fitting may be associated with the first end of the first transport member. The second fitting may be associated with the second end of the second transport member.

The seal is placed around the first fitting and the second fitting with the first end of the first transport member positioned next to the second end of the second transport member. The seal is configured to seal an interface between the first end of the first transport member and the second end of the second transport member when the first end and the second end are positioned next to each other.

In one illustrative example, the seal includes a first gasket, a second gasket, and a sleeve. The first gasket is placed around the first fitting, and the second gasket is placed around the second fitting. The sleeve is then placed around the first gasket and the second gasket. The sleeve compresses the first gasket and the second gasket to seal the interface between the first end of the first transport member and the second end of the second transport member. The coupling assembly between the first transport member and the second transport member may be configured to form a conductive pathway between the first transport member and the second transport member.

The process dissipates the electrostatic charge that builds up on the surface of the at least one of the first transport member and the second transport member during operation of the aerospace vehicle, using the conductive pathway between the first transport member and the second transport member (operation 1402), with the process terminating thereafter. In this manner, the coupling assembly allows the first transport member and the second transport member to be grounded from one transport member to the other. A number of electrical currents may flow from one transport member to the other transport member without interruption and without the level of the electrical currents changing outside of selected tolerances.

The flowchart and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 takes place. Thereafter, aircraft 1600 may go through certification and delivery 1510 in order to be placed in service 1512. While in service 1512 by a customer, aircraft 1600 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with systems 1604 and interior 1606. Examples of systems 1604 include one or more of propulsion system 1608, electrical system 1610, hydraulic system 1612, environmental system 1614, and fuel system 1616. Fuel system 1616 and hydraulic system 1612 may be implemented using, for example, fluid transport system 100 in FIG. 1.

Any number of other systems may be included in systems 1604, depending on the implementation. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. For example, tubes, such as plurality of tubes 111 in FIG. 1, may be manufactured, installed, and/or reworked in aircraft 1600 during at least one of component and subassembly manufacturing 1506, system integration 1508, and maintenance and service 1514.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15. The use of a number of the different illustrative embodiments may substantially expedite the assembly of and/or reduce the cost of aircraft 1600.

Thus, the different illustrative embodiments provide a method and apparatus for reducing an intensity of an electrical discharge that may occur within a fluid transport system. In one illustrative embodiment, a fluid transport system comprises a plurality of transport members and a number of connections connecting transport members in the plurality of transport members to each other. The plurality of transport members and the number of connections may be comprised of materials selected such that the intensity of an electrical discharge that occurs within the fluid transport system may be reduced to within selected tolerances.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A coupling assembly comprising:
a first ferrule attached to a first end of a first transport member, the first ferrule and the first transport member both having a level of conductivity within a selected range;
a second ferrule attached to a second end of a second transport member, the second ferrule and the second transport member both having the level of conductivity within the selected range;
a first gasket received by the first ferrule, wherein the first gasket comprises a viscoelastic material having the level of conductivity within the selected range;
a second gasket received by the second ferrule, wherein the second gasket comprises the viscoelastic material having the level of conductivity within the selected range;
a clamshell device disposed over the first ferrule and the second ferrule, wherein the first gasket and the second gasket are disposed within the clamshell device, and wherein the clamshell device is non-conductive relative to the level of conductivity;
a sleeve connected to an inside surface of the clamshell device, wherein the sleeve is in contact with the first gasket and the second gasket, wherein the sleeve has the level of conductivity within the selected range, and wherein sidewalls of the clamshell device are not in contact with any of the sleeve, the first gasket, and the second gasket, wherein a conductive pathway is formed between the first transport member and the second transport member via the first ferrule, the first gasket, the sleeve, the second gasket, and the second ferrule; and
a hinge connected to the clamshell device and configured to allow opening and closing of the clamshell device onto the first ferrule, the second ferrule, the first gasket, and the second gasket, and wherein when closed the clamshell device forms a seal between the first transport member and the second transport member.

2. The coupling assembly of claim 1, wherein the selected range is between about $1\times10^{-4}$ Siemens/centimeters and about $1\times10^{-9}$ Siemens/centimeters.

3. The coupling assembly of claim 1, wherein the first fitting, the second fitting, the first gasket, the second gasket, and the sleeve are comprised of nonmetallic materials having the level of conductivity within the selected range.

4. The coupling assembly of claim 1, wherein the first gasket is a first O-ring and the second gasket is a second O-ring.

5. The coupling assembly of claim 1, wherein an electrical current induced in at least one of the first transport member and the second transport member by electrostatic charge that builds up on the at least one of the first transport member and the second transport member is conducted along the conductive pathway.

6. The coupling assembly of claim 1, wherein the viscoelastic material comprises a conductive elastomer.

7. The coupling assembly of claim 1, wherein the seal seals the interface between the first end of the first transport member and the second end of the second transport member by reducing a possibility of material flowing at least one of into and out of a channel formed by the first transport member and the second transport member.

8. The coupling assembly of claim 1, wherein the first transport member and the second transport member are fuel transport members in a fuel system for an aerospace vehicle in which the fuel system has an overall level of conductivity within the selected range.

9. A coupling assembly comprising:
a first ferrule attached to a first end of a first transport member, the first ferrule and the first transport member both having a level of conductivity within a selected range;
a second ferrule attached to a second end of a second transport member, the second ferrule and the second transport member both having the level of conductivity within the selected range;
a first gasket received by the first ferrule, wherein the first gasket comprises a viscoelastic material having the level of conductivity within the selected range;
a second gasket received by the first ferrule, wherein the second gasket comprises the viscoelastic material having the level of conductivity within the selected range;

a third gasket received by the second ferrule, wherein the third gasket comprises a viscoelastic material having the level of conductivity within the selected range;

a fourth gasket received by the second ferrule, wherein the fourth gasket comprises the viscoelastic material having the level of conductivity within the selected range;

a clamshell device disposed over the first ferrule and the second ferrule, wherein the first gasket and the third gasket are disposed within the clamshell device, wherein the second gasket and the fourth gasket are disposed under the clamshell device, and wherein the clamshell device comprises a material having the level of conductivity; and a sleeve connected to an inside surface of the clamshell device, wherein the sleeve is in contact with the first gasket and the third gasket, wherein the sleeve has the level of conductivity within the selected range, and wherein sidewalls of the clamshell device are not in contact with any of the sleeve, the first gasket, and the second gasket, wherein the sidewalls are in contact with the second gasket and the fourth gasket, wherein a first conductive pathway is formed between the first transport member and the second transport member via the first ferrule, the first gasket, the sleeve, the second gasket, and the second ferrule, and wherein a second conductive pathway is formed between the first transport member and the second transport member via the first ferrule, the second gasket, the clamshell device, the fourth gasket, the second ferrule, and the second transport member.

10. The coupling assembly of claim 9, wherein the selected range is between about $1\times10^{-4}$ Siemens/centimeters and about $1\times10^{-9}$ Siemens/centimeters.

11. The coupling assembly of claim 9, wherein the first fitting, the second fitting, the first gasket, the second gasket, the third gasket, the fourth gasket, and the sleeve are comprised of nonmetallic materials having the level of conductivity within the selected range.

12. The coupling assembly of claim 9, wherein the first gasket is a first O-ring, the second gasket is a second O-ring, third gasket is a third O-ring and the fourth gasket is a fourth O-ring.

13. The coupling assembly of claim 9, wherein an electrical current induced in at least one of the first transport member and the second transport member by electrostatic charge that builds up on the at least one of the first transport member and the second transport member is conducted along the conductive pathway.

14. The coupling assembly of claim 9, wherein the viscoelastic material comprises a conductive elastomer.

15. The coupling assembly of claim 9, wherein the seal seals the interface between the first end of the first transport member and the second end of the second transport member by reducing a possibility of material flowing at least one of into and out of a channel formed by the first transport member and the second transport member.

16. The coupling assembly of claim 9, wherein the first transport member and the second transport member are fuel transport members in a fuel system for an aerospace vehicle in which the fuel system has an overall level of conductivity within the selected range.

17. The coupling assembly of claim 9 further comprising:
a hinge connected to the clamshell device and configured to allow opening and closing of the clamshell device onto the first ferrule, the second ferrule, the first gasket, the second gasket, the third gasket, and the fourth gasket, and wherein when closed the clamshell device forms a seal between the first transport member and the second transport member.

\* \* \* \* \*